United States Patent [19]
Kay et al.

[11] Patent Number: 6,096,094
[45] Date of Patent: Aug. 1, 2000

[54] CONFIGURATION MANAGER FOR CONFIGURING A DATA ACQUISITION SYSTEM

[75] Inventors: Meg F. Kay, Cupertino, Calif.; Jonathan Brumley, Austin, Tex.; Howard Tsoi, Austin, Tex.; Kurt Carlson, Austin, Tex.

[73] Assignee: National Instruments Corporation, Austin, Tex.

[21] Appl. No.: 08/943,784

[22] Filed: Oct. 3, 1997

[51] Int. Cl.[7] ....................................... G06F 9/44
[52] U.S. Cl. .................................... 717/1; 717/11
[58] Field of Search .................... 395/712, 828; 710/8; 713/100; 717/1

[56] References Cited

U.S. PATENT DOCUMENTS

| | | | |
|---|---|---|---|
| 5,161,102 | 11/1992 | Griffin et al. | 395/800 |
| 5,311,424 | 5/1994 | Mukherjee et al. | 705/29 |
| 5,504,905 | 4/1996 | Cleary et al. | 713/100 |
| 5,546,595 | 8/1996 | Norman et al. | 710/10 |
| 5,579,529 | 11/1996 | Terrell et al. | 395/828 |
| 5,638,299 | 6/1997 | Miller | 702/127 |
| 5,740,431 | 4/1998 | Rail | 707/200 |
| 5,751,575 | 5/1998 | Hirosawa et al. | 364/188 |
| 5,764,546 | 6/1998 | Bryant et al. | 364/580 |
| 5,787,246 | 7/1998 | Lichtman et al. | 395/200.5 |
| 5,790,977 | 8/1998 | Ezekiel | 702/122 |
| 5,809,329 | 9/1998 | Lichtman et al. | 395/828 |
| 5,822,565 | 10/1998 | DeRosa, Jr. et al. | 395/500.45 |
| 5,870,610 | 2/1999 | Beyda | 395/712 |
| 5,887,165 | 3/1999 | Martel et al. | 713/100 |
| 5,925,109 | 7/1999 | Bartz | 710/14 |
| 5,926,775 | 7/1999 | Brumley et al. | 702/127 |
| 5,974,257 | 10/1999 | Austin | 395/708 |

OTHER PUBLICATIONS

David J. Sides, "A Dynamically Adaptable Real Time Acquisition and Display System", IEEE, Dec. 1995.
Gary Ockwell and Gary Killian, "Configuration Management in an open architecture System", IEEE, pp. 441–444, May 1993.
"Kaye's New Programmmer Simplifies Configuration of Data Acquisition Systems"; News Release, May 10, 1990; 1 pp. 1; PROMT (online); Retrieved from STN International, Accession No. 90:215178.

*Primary Examiner*—Eric W. Stamber
*Assistant Examiner*—Todd Ingberg
*Attorney, Agent, or Firm*—Conley, Rose & Tayon P.C.; Jeffrey C. Hood

[57] ABSTRACT

A data acquisition system comprising a Configuration Manager for intelligently managing access to DAQ configuration information. The data acquisition system comprises a computer system coupled to a data acquisition device, a data acquisition application (user application) executing on the computer system, and DAQ driver level software executing on the computer system. The memory of the computer system stores a hardware database which includes information on DAQ objects in the DAQ system, and the memory stores configuration files which comprise desired configurations of the DAQ system. The Configuration Manager of the present invention executes in the computer system to control access to the hardware database and configuration files stored in the computer system. The present invention also includes a method for providing access to information on data acquisition (DAQ) objects in the DAQ system. The Configuration Manager accesses the configuration information from the system memory if the configuration information comprises modified parameter values stored in the memory, and the Configuration Manager otherwise accesses the configuration information from the hardware database. The present invention also includes a method for providing access to additional or new information on data acquisition (DAQ) objects in a DAQ system. The user of the DAQ system can receive an updated hardware database, and an existing configuration file can automatically access the additional capabilities of the DAQ object from the installed updated hardware database.

43 Claims, 21 Drawing Sheets

DAQ application checks the validity of current configuration settings

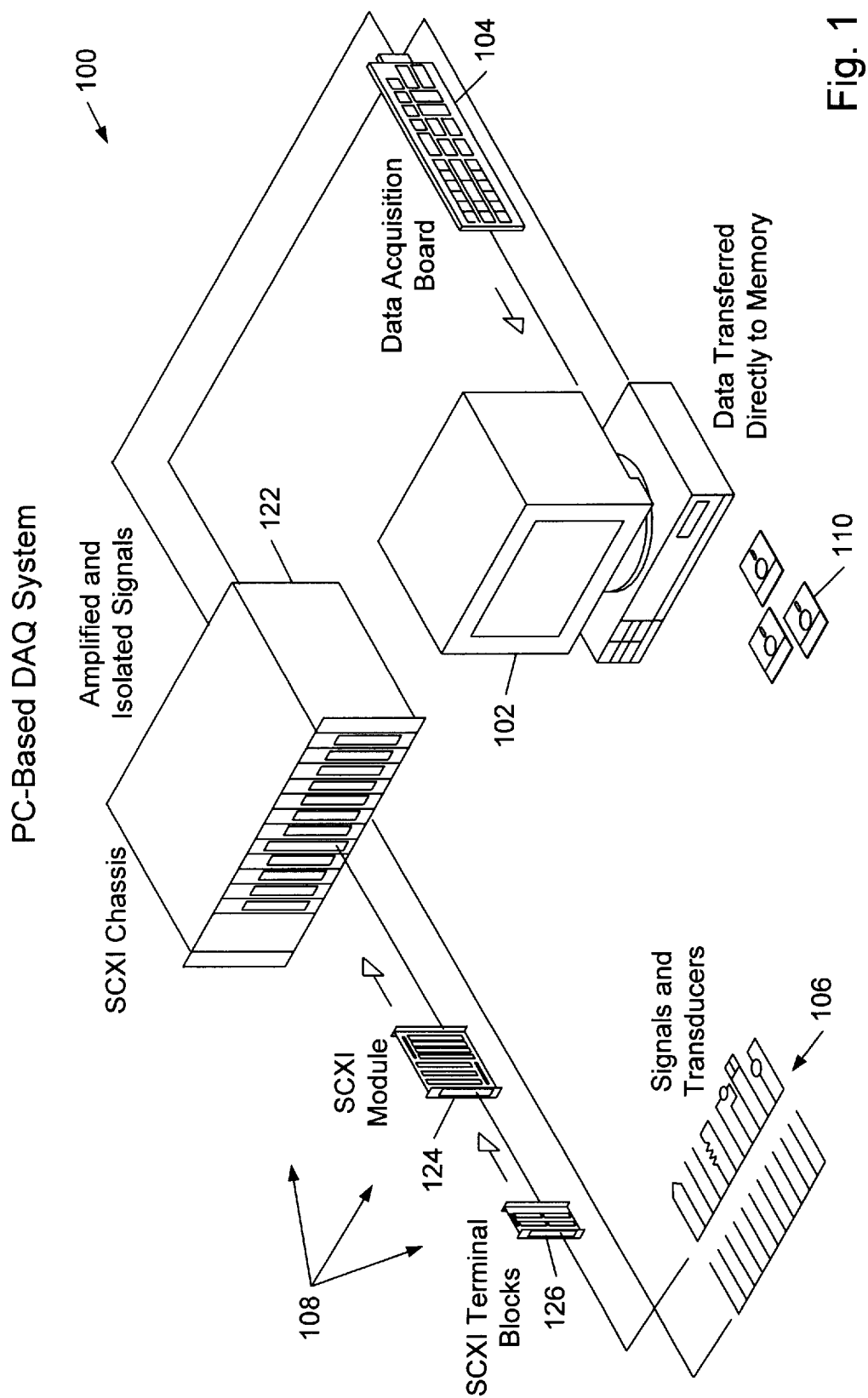

DAQ application checks the validity of current configuration settings

DAQ application determines the capabilities of a hardware product

MeasuredBy-Measures Links

ConfigRootClass
   SystemClass
   Device Class
      AIChanClass (IDNum = 0)
      AIChanClass (IDNum = 1)
      ...
      AIChanClass (IDNum = 15)
      AOChanClass (IDNum = 0)
      AOChanClass (IDNum = 1)
      DevISAPnPConnClass
   DevModConnClass
   SCXIModClass AIChanClass (IDNum = 1)
      ...
      AIChanClass (IDNum = 7)
   ChassisModConnClass
   SCXIChassClass
   ModAccConnClass
   AccessoryClass

CONFIGURATION MANAGER FOR CONFIGURING A DATA ACQUISITION SYSTEM

BACKGROUND OF THE INVENTION

1. Field of the Invention

The present invention relates to data acquisition (DAQ) systems, and more particularly to a configuration manager for configuring a data acquisition system.

2. Description of the Related Art

Scientists and engineers often use DAQ systems to perform a variety of functions, including laboratory research, process monitoring and control, data logging, analytical chemistry, test and analysis of physical phenomena, and control of mechanical or electrical machinery, to name a few examples. A DAQ system typically includes transducers and other detecting means for providing "field" electrical signals representing a process, physical phenomena, equipment being monitored or measured, etc. For example, detectors and/or sensors are used to sense the on/off state of power circuits, proximity switches, push-button switches, thermostats, relays or even the presence of positive or negative digital logic-level signals.

A typical DAQ system comprises a computer system with DAQ hardware, wherein the DAQ hardware is typically plugged into one of the I/O slots of the computer system. The field signals are provided to the DAQ hardware. In another common DAQ system configuration, the DAQ hardware is coupled to the computer system via other means such as through a VXI (VME eXtensions for Instrumentation) bus, a GPIB (General Purpose Interface Bus), a serial port, or parallel port of the computer system. Optionally, the DAQ hardware includes signal conditioning modules which receive the field signals and condition the signals to be acquired.

The DAQ hardware is configured and controlled by DAQ software executing on the computer system. The DAQ software for configuring and controlling the DAQ system typically comprises two portions: the device interface or driver level software and the application software, or the application. The device interface software serves to interface the DAQ hardware to the application. The device interface software is typically supplied by the manufacturer of the DAQ hardware or by some other third party software vendor. The application is typically developed by the user of the DAQ system and is tailored to the particular function which the user intends the DAQ system to perform. The DAQ hardware manufacturer or third party software vendor sometimes supplies the application software for applications which are common, generic or straightforward.

Data acquisition devices, such as DAQ interface cards, as well as DAQ driver level software, can have various types of parameters or attributes. In the present disclosure, the terms "parameters" and "attributes" are used interchangeably. In other words, a DAQ interface card can be configured in various ways. Common examples of DAQ hardware attributes and/or attributes of the software controlling the DAQ hardware are the range of input values (voltages, currents, etc.) which the DAQ hardware will acquire; the manner of coupling the DAQ hardware to the field signals (e.g., DC or AC); the input mode of the acquired signals (e.g., differential or single-ended); various acquisition trigger related attributes such as trigger mode, trigger source, trigger action, trigger level, etc.; attributes relating to acquisition clocks; the size of the buffer for receiving the acquired data; and the engineering units associated with the values of the acquired data.

In many DAQ systems, the user can also create and store a desired configuration of a DAQ system, such as the DAQ devices present in the system as well as desired hardware and software settings.

In order to efficiently operate a DAQ system, a user and/or user application is often required to determine the capabilities of a DAQ hardware product, change the value of a configuration parameter, obtain the current value of a configuration parameter, and check the validity of current configuration settings. It is also often desirable for a user and/or user application to store and retrieve desired configuration settings. Further, it would be desirable for a user to be able to transparently use new or newly supported capabilities of a DAQ device.

Therefore, an improved DAQ system and method is desired for managing access to DAQ system configuration information, including hardware settings and stored configuration files, as well as for providing access to capabilities of DAQ objects.

SUMMARY OF THE INVENTION

The present invention provides a data acquisition system comprising a Configuration Manager for intelligently managing access to DAQ configuration information. Broadly speaking, the data acquisition system comprises a computer system coupled to a data acquisition device, a data acquisition application (user application) executing on the computer system, and driver level or device interface software executing on the computer system which enables the data acquisition application to perform steps to control the data acquisition device.

The nonvolatile memory of the computer system stores a hardware database which includes information on DAQ objects in the DAQ system, and the nonvolatile memory also stores configuration files which comprise desired configurations of the DAQ system. The Configuration Manager of the present invention also executes in the computer system to control access to the hardware database and configuration files stored in the computer system. The system also includes a configuration utility which is executable to create a configuration file.

The DAQ user application interfaces through the Configuration Manager to obtain default configuration settings, capabilities and other configuration information. The Configuration Manager interfaces through a persistent storage manager to the hardware database, wherein the hardware database stores default settings of DAQ devices or DAQ objects. The persistent storage manager also provides access to user configuration files which store desired user configurations of the DAQ system. The Configuration Manager also interfaces to a system settings manager to obtain system settings information, i.e., information which configures communication between the computer system and the DAQ device. The Configuration Manager thus controls access to the hardware database, the configuration files and system settings.

The present invention also includes a method for providing access to information on data acquisition (DAQ) objects in the DAQ system. When a user application requests configuration information on one or more DAQ objects, the Configuration Manager executing in the computer system receives the request and determines if the requested information or parameters resides in the system memory. In general, default settings of DAQ objects are persistently stored in the hardware database, and modified parameter values are stored in the system memory. The Configuration Manager accesses the configuration information from the system memory if the configuration information comprises modified parameter values stored in the memory. The Configuration Manager otherwise accesses the configuration information from the hardware database, e.g., if the configuration information comprises default parameter values or other information stored in the hardware database. If the requested configuration information comprises system settings, the Configuration Manager communicates with a system settings manager to access the requested system settings.

The present invention also includes a method for providing access to new or newly supported information on data acquisition (DAQ) objects in a DAQ system. In this method, it is presumed that the user and/or a user application first creates a configuration file which specifies a configuration of the DAQ system. The configuration file is created using the first hardware database which does not include the new or newly supported information. The configuration file may include settings, i.e., specified parameter values, for one or more DAQ objects.

After the time that the configuration file is created, a company which developed a DAQ object used in the system may decide to provide software support for additional features in the DAQ object by updating the hardware database. For example, if the DAQ object is a DAQ interface card, and the company decides to provide software support for certain previously unsupported features or capabilities, the company would update the hardware database with these additional unsupported features or capabilities. Alternatively, the company may offer a new DAQ object, such as a new DAQ interface card, which includes new features or capabilities.

When the user of the DAQ system receives an updated database, the user installs the updated hardware database in the computer system. Thus the updated hardware database is installed after one or more configuration files were created using the first hardware database. The updated hardware database includes information regarding additional or newly supported capabilities of the DAQ object, e.g., includes one or more additional parameters for the DAQ object.

When the previously created configuration file is used, the configuration file automatically accesses the additional capabilities of the DAQ object from the installed updated hardware database, i.e., the configuration file obtains information on the additional capabilities of the DAQ object from the updated hardware database. The configuration file preferably automatically accesses the additional capabilities of the DAQ object utilizing the services of the Configuration Manager. It is noted that the configuration file is not required to be modified in order to automatically access the additional capabilities of the DAQ object. Thus the new capabilities are accessed transparently to the user and/or the user application.

BRIEF DESCRIPTION OF THE DRAWINGS

A better understanding of the present invention can be obtained when the following detailed description of the preferred embodiment is considered in conjunction with the following drawings, in which:

FIG. 1 illustrates a DAQ system according to the present invention;

DETAILED DESCRIPTION OF THE PREFERRED EMBODIMENT

Incorporation by Reference

Figure 1A:
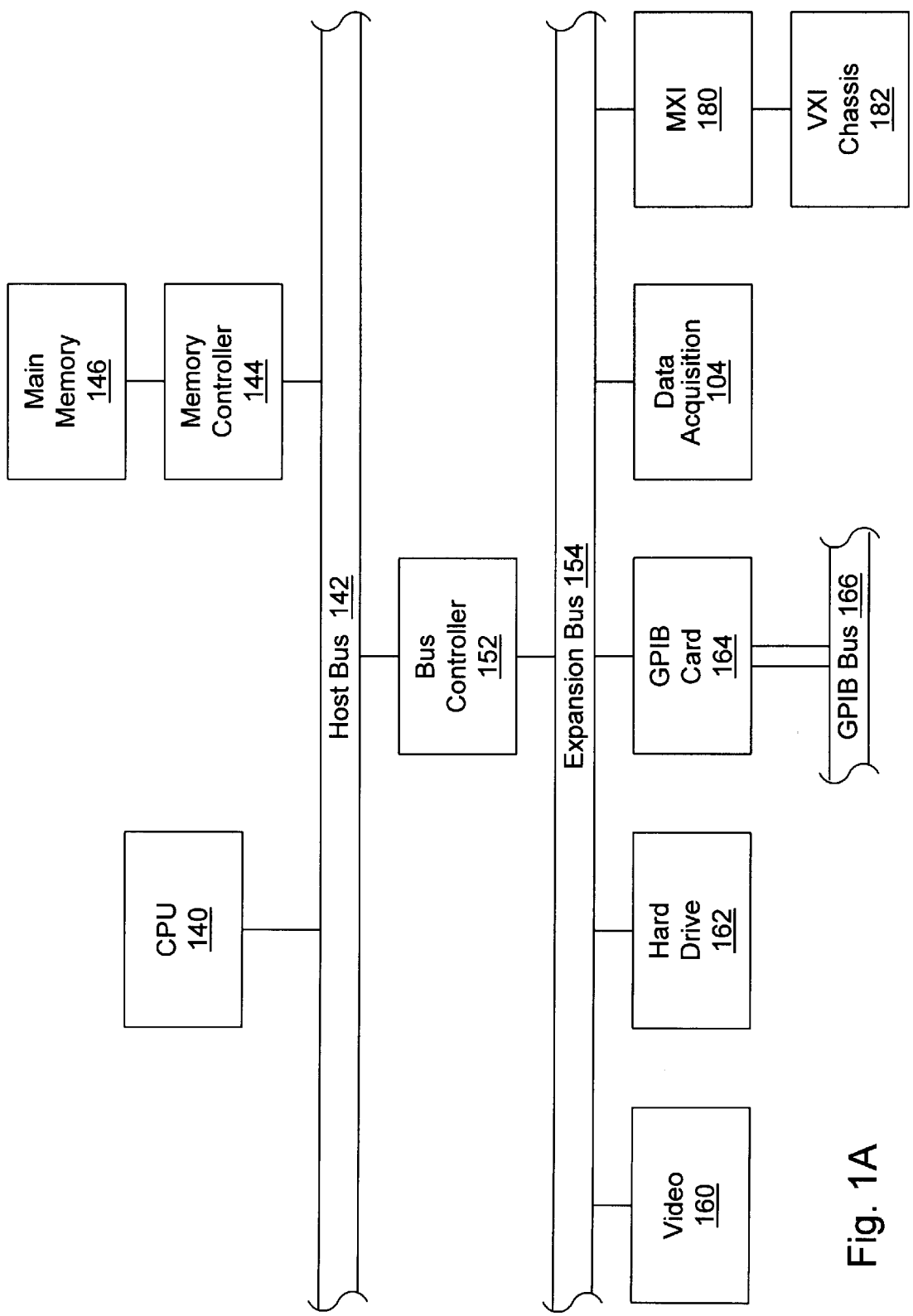
FIG. 1A is a block diagram of the computer system of FIG. 1.

U.S. patent application Ser. No. 08/711,128 titled "Attribute-Based System and Method for Configuring and Controlling a Data Acquisition Task" filed Sep. 9, 1996, (Docket 5150-15700) whose inventors are Tim Hayles and James Bednar, is hereby incorporated by reference as though fully and completely set forth herein.

U.S. patent application Ser. No. 08/756,401 titled "DAQ Configuration System and Method for Configuring Channels in a Data Acquisition Device" filed Nov. 27, 1996, (Docket 5150-18500) whose inventors are Deborah E. Bryant and Audrey F. Harvey, is hereby incorporated by reference as though fully and completely set forth herein.

FIG. 1—DAQ System

Referring now to FIG. 1, an illustrative DAQ system 100 according to the present invention is shown. The system 100 comprises a computer 102 running an operating system, a DAQ device or board 104 coupled to the computer 102, and transducers 106 or other detecting means which provide field electrical signals to the DAQ device 104, optionally through signal conditioning circuitry 108. The computer 102 includes various standard components, including at least one central processing unit (CPU), nonvolatile memory, system memory, a hard drive, one or more buses, and a power supply. The computer 102 preferably includes a memory media, such as magnetic media, e.g., a CD-ROM, floppy disk(s) 110, on which computer programs according to the present invention are stored. The software programs of the present invention are also stored in the system memory and/or hard drive of the computer 102 and executed by the CPU. The CPU executing code and data from the memory thus comprises a means for configuring and controlling the DAQ device 104 to acquire data from the field signals according to the steps described below.

In one embodiment, the computer 102 comprises input/output (I/O) slots into which the DAQ device 104 is coupled. In another embodiment, the computer 102 comprises a VXI (VME Extensions for Instrumentation) chassis and bus, a GPIB (General Purpose Interface Bus), a serial port or parallel port by which the DAQ device 104 is coupled to the computer 102. Examples of computer 102 are IBM-compatible personal computers, APPLE MACINTOSH computers, and SUN MICROSYSTEM workstations and operating systems which execute on them.

In one embodiment, the transducers 106 are coupled directly to the DAQ device 104. In another embodiment, the signals received by the transducers 106 are conditioned by the signal conditioning circuitry 108 for presentation to the DAQ device 104 as shown. An example of signal conditioning circuitry 108 is Signal Conditioning Extensions for Instrumentation (SCXI) circuitry. SCXI is an open architecture, multi-channel signal conditioning front-end system for DAQ devices. SCXI comprises an external chassis 122 housing signal conditioning modules 124 and optionally terminal blocks 126 for amplifying, multiplexing, and isolating field signals. The signal conditioning modules advantageously reduce the introduction of noise into the signals transmitted to the DAQ device 104. The term "data acquisition" used in this specification is intended to encompass data generation as well as data acquisition, particularly as applied to instrumentation and process control systems.

The transducers 106 and other detecting means provide the field signals representing a process, physical phenomena, equipment being monitored or measured, etc. to the DAQ device 104. Examples of the transducers 106 are strain gauges, thermocouples, thermistors, photoconductive cells, microphones, and piezoelectric transducers, among others.

The DAQ device 104 is configured to acquire or generate signals of distinct I/O types. In particular, the I/O types comprise analog input signals, analog output signals, digital input signals, digital output signals and counter/timer inputs and outputs. The analog input and output signals are received and generated, respectively, on analog "channels" of the DAQ device 104. The digital input and output signals are received and generated, respectively, on digital I/O "ports" of the DAQ device 104. Each channel, port or counter has an associated number which uniquely identifies it with respect to the DAQ device 104 on which it resides.

Examples of DAQ device 104 are the following products available from NATIONAL INSTRUMENTS CORPORATION: the AT-MIO-16 series analog input boards, the AT-AO-6/10 series analog output boards, the PC-DIO-96 digital I/O board, and the PC-TIO-10 counter/timer I/O board. Examples of the SCXI circuitry 108 are the NATIONAL INSTRUMENTS CORPORATION SCXI-1000 4-slot chassis, the SCXI-1100 32-channel multiplexer amplifier module, and SCXI-1160 16-channel power relay module.

FIG. 1A—Computer Block Diagram

FIG. 1A illustrates a block diagram of the computer system 102. It is noted that the computer system 102 may have various different architectures, as desired. The elements of a computer system not necessary to understand the operation of the present invention have been omitted for simplicity.

The computer system 102 includes a central processing unit or CPU 140 which is coupled to a processor or host bus 142. The CPU 140 may be any of various types, including an Intel x86 processor such as the Pentium class from Intel, a PowerPC CPU from the Motorola family of processors, as well as others.

Main memory 146, also referred to as system memory 146, is coupled to the host bus 142 by means of memory controller 144. The system memory 146 stores various software used in the DAQ system 100, including DAQ driver level software, preferably NI-DAQ from National Instruments, and a DAQ user application, such as LabVIEW, LabWindows CVI, BridgeVIEW, ComponentWorks, the DAQ Channel Wizard, etc. The system memory 146 also stores a Configuration Manager 202 (see FIG. 3) according to the present invention. The Configuration Manager 202 is executable by the CPU 140 to perform operations described below. A configuration utility 208 (see FIG. 3) and system settings manager 222 (see FIG. 3) are also stored in the system memory 146.

Host bus 142 is coupled to an expansion or input/output bus 154 by means of a bus controller 152. The expansion bus 154 is preferably the PCI (Peripheral Component Interconnect) bus, and the bus controller 152 is preferably chipset logic, available from Intel Corporation. The expansion bus 154 includes slots for various devices, including video 160.

A nonvolatile memory or hard drive 162 is comprised in the computer system 102 and may be coupled to the expansion bus 154 or to the chipset 152, or to other logic. The nonvolatile memory 162 stores a hardware database 210 and one or more configuration files 224, as described further below. The nonvolatile memory 162 also stores an operating system as well as application programs, as known in the art.

Data acquisition card 104 is connected to the expansion bus 154. The data acquisition card 104 receives analog (or digital) signals from an external sensor or instrument and in turn produces digital data that is provided to the CPU 140 and/or the system memory 146. The DAQ card 104 is controlled by the DAQ driver level software and the DAQ user application executing in the system memory 146.

The computer system 102 may also include a GPIB (General Purpose Interface Bus) card 164 that interfaces to one or more instruments via the GPIB bus 166, and may include a MXI card 180 that connects to a VXI chassis 182.

Figure 2:
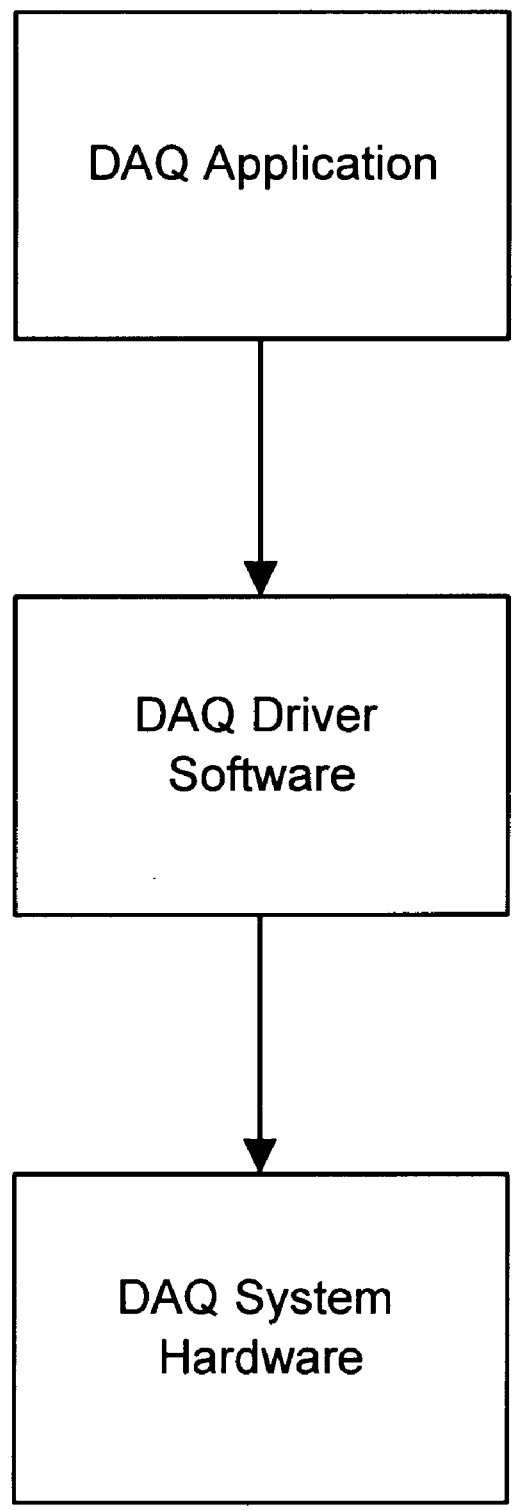
FIG. 2 illustrates the software/hardware hierarchy of the DAQ system of FIG. 1.

FIG. 2—DAQ Software Block Diagram

Referring now to FIG. 2, a block diagram illustrating the relationship of portions of the DAQ system 100 (FIG. 1) is shown. DAQ application software interfaces with DAQ driver level software according to the present invention to configure and control the DAQ device 104 (FIG. 1).

The DAQ driver level software provides a means for the DAQ application to interface to the DAQ device 104. The DAQ driver level software comprises device drivers for communicating with the DAQ device 104. The device drivers perform input/output operations to registers on the DAQ device 104 or perform memory transfers to shared memory on the DAQ device 104 to configure and control the DAQ device 104. The device drivers also service interrupts from the DAQ device 104 and perform direct memory access data transfers from or to the DAQ device 104 when appropriate. Further, the device drivers interact with the operating system executing on the computer 102 to perform such operations as allocating memory for the DAQ application 32 and device interface software itself. The device drivers execute at the required privilege level to perform the aforementioned operations.

The DAQ driver level software comprises a function library object code file which is linked with the DAQ application object files. The DAQ driver level software further comprises a dynamic link library (DLL) containing executable functions which the DAQ application calls during execution of the DAQ application.

The DAQ application provides an interface to the user of the DAQ system. The user receives output via output devices of the computer 102, such as a display screen, and provides input via input devices such as a mouse or keyboard of the computer 102 (of FIG. 2) to direct the acquisition of field signal data. In addition, the DAQ application calls functions of the DAQ driver level software to configure the attributes of the DAQ device 104, DAQ system 100, or a DAQ task to control the acquisition of field signal data by the system 100.

Figure 3:
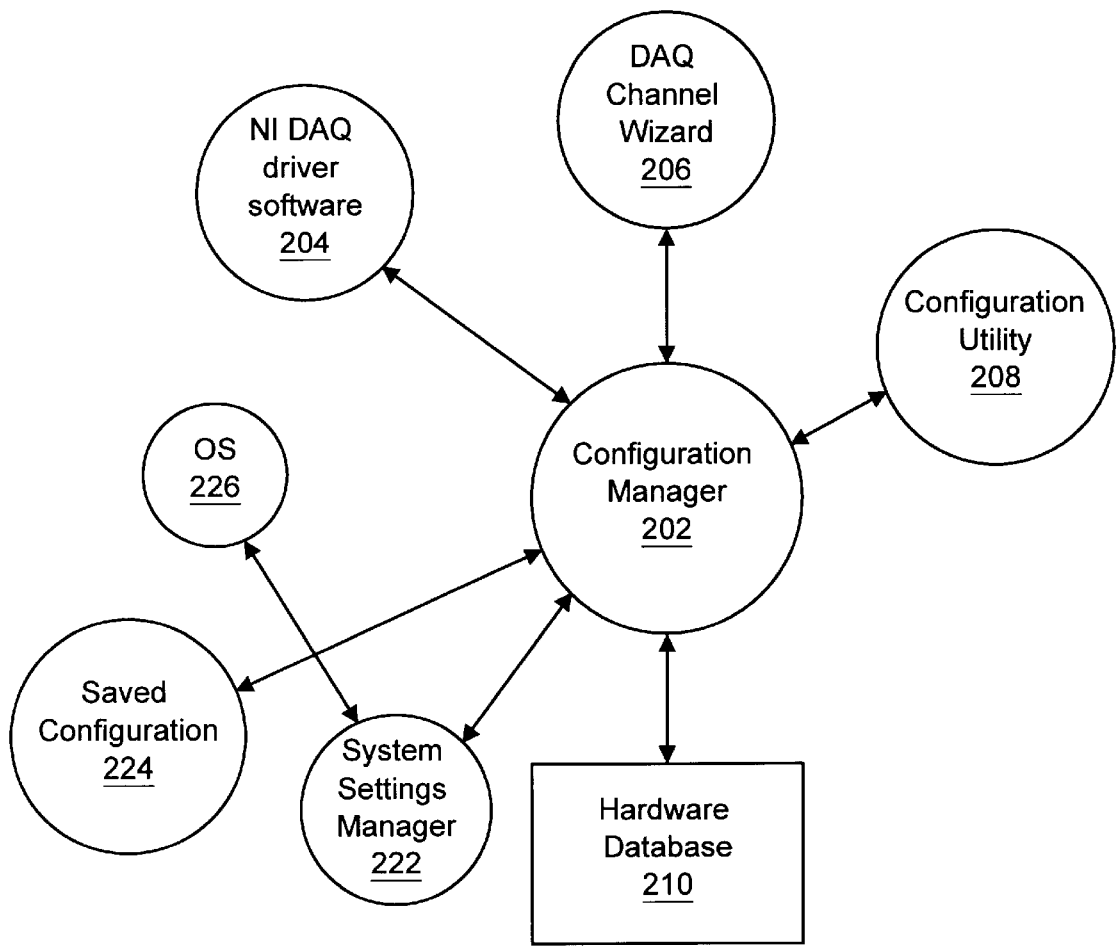
FIG. 3 is a block diagram illustrating various components or objects in the DAQ system.

FIG. 3—DAQ Software Components

FIG. 3 is a block diagram illustrating various software components comprised in the DAQ system according to the present invention. As shown, the DAQ system includes a Configuration Manager 202. The Configuration Manager 202 interfaces to a hardware database 210. The hardware database 210 stores configuration information and capabilities of various DAQ objects which may be comprised in the DAQ system 100. For example, the hardware database 210 stores information on the various types of data acquisition cards or boards 104 which can be used in the data acquisition system 100. In the preferred embodiment, the hardware database 210 stores information on data acquisition boards available from National Instruments Corporation.

In the present disclosure, the term "DAQ object" refers to data acquisition objects which can be included in a DAQ system, such as a DAQ interface card, SCXI modules, an SCXI chassis, SCXI accessories such a terminal blocks, cables, and a virtual channel created using the DAQ Channel Wizard. The term "DAQ object" is also used to refer to a software object which corresponds to the physical DAQ object. The possible attributes or parameters of a DAQ object in the data acquisition system 100, such as the DAQ card 104, include the range of input values (voltages, currents, etc.) which the DAQ device 104 will acquire; the manner of coupling the DAQ device 104 to the field signals (e.g., DC or AC); the input mode of the acquired signals (e.g., differential or single-ended); various acquisition trigger related attributes such as trigger mode, trigger source, trigger action, trigger level, etc.; attributes relating to acquisition clocks; the size of the buffer for receiving the acquired data; and the engineering units associated with the values of the acquired data.

The Configuration Manager 202 also communicates with a system settings manager 222. This system settings manager 222 stores system specific information regarding the DAQ system 100.

The Configuration Manager 202 further communicates with a saved configuration or user configuration files 224. The configuration files 224 are used to store a particular configuration of the DAQ system 100 created by a user or user application. Thus, each time the DAQ system 100 boots up, a saved configuration or configuration file 224 can be accessed and used to configure the DAQ system 100 with a preferred configuration.

The Configuration Manager 202 comprises the programmatic interface to the hardware database 210, the system settings manager 222 and the configuration files 224. For example, if a user application desires to determine whether a certain DAQ product has certain capabilities, the user application makes a request to the Configuration Manager 202 which in turn queries the hardware database 210 for the respective information. The hardware database 210 is preferably updated with new information as new DAQ boards or DAQ devices are introduced. In a similar manner, if a user application desires to know certain system settings, the user application makes a request to the Configuration Manager 202 which in turn queries the system settings manager 222 for the respective information. Also, if a user application desires to restore a saved configuration, the user application makes a request to the Configuration Manager 202 which in turn accesses the appropriate configuration file 224 and loads the configuration on the system.

The Configuration Manager 202 essentially operates as a server to one or more clients. As shown, user applications such as NI-DAQ driver software 204, the DAQ channel wizard 206, and the configuration utility 208 may each operate as clients to access the capabilities of functions of the Configuration Manager 202. More specifically, each of the user applications 204, 206 and 208 can make requests to obtain information on DAQ devices through the Configuration Manager 202. For more information on the DAQ Channel Wizard, please see U.S. patent application Ser. No. 08/756,401 titled "DAQ Configuration System and Method for Configuring Channels in a Data Acquisition Device", referenced above.

Figure 4:
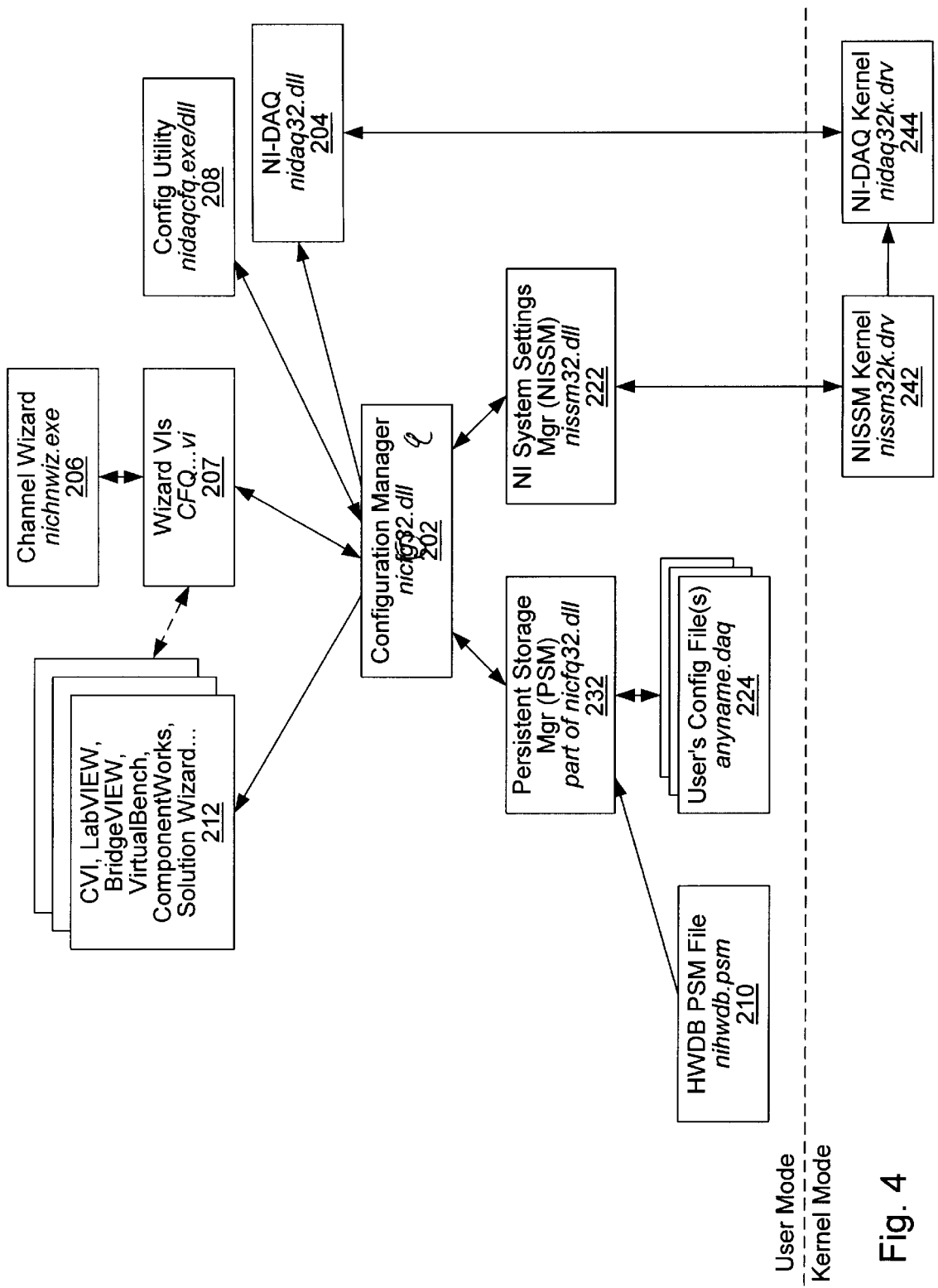
FIG. 4 is a more detailed block diagram illustrating various components or objects in the DAQ system.

FIG. 4—DAQ Software Components

FIG. 4 is a more detailed block diagram illustrating the software components comprised in the DAQ system 100 according to the present invention. As shown, the Configuration Manager 202 can serve various types of clients including NI DAQ driver level software 204, the configuration utility 208, the Channel Wizard 206 and associated Wizard VIs 207, and various other user applications 212 such as LabWindows CVI, LabVIEW, BridgeVIEW, VirtualBench, ComponentWorks, and the DAQ Solution Wizard. The above applications are available from National Instruments Corporation. The Configuration Manager 202 may provide service to other types of user applications as desired.

As shown in FIG. 4, the Configuration Manager 202 accesses user configuration files 224 through a persistent storage manager 232. The user configuration files 224 are stored in the nonvolatile memory 122 such as the hard drive of the computer 102. The persistent storage manager 232 provides a persistent storage mechanism for user configuration files 224. As shown, the persistent storage manager 232 can both store and retrieve user configuration files 224. The persistent storage manager 232 also controls access to the hardware database 210, which facilitates persistent storage of the hardware database 210. The hardware database 210 stores the default settings for various DAQ boards 104, and thus the hardware database 210 is read-only.

As shown, the Configuration Manager 202 also accesses the system settings manager 222 for system specific parameters. The system settings manager 222 further communicates with a system setting manager (NISSM) kernel 242. The NI-DAQ software 204 communicates with an NI-DAQ kernel 244. The NISSM kernel 242 communicates with the NI-DAQ kernel software 244.

It is noted that the elements above the dotted line in FIG. 4, these being the user applications 212, 206, 207, 208, and 204, the Configuration Manager 202, the persistent storage manager 232, the system settings manager 222, the user configuration files 224 and the hardware database 210 operate in user mode of the CPU, and the NISSM kernel 242 and NI DAQ kernel 244 operate in kernel mode of the CPU.

Configuration Manager Overview

The Configuration Manager 202 manages DAQ configuration information, including hardware settings such as polarity and gain, and software settings such as channel names and data scaling parameters. An application uses the Configuration Manager 202 to do the following:
determine the capabilities of a hardware product
change the value of a configuration parameter
get the current value of a configuration parameter
check the validity of current configuration settings These four main Configuration Manager services are explained further below. The Configuration Manager 202 reports the capabilities of the hardware by reading information in the Hardware Database 210. The Configuration Manager 202 is the programmatic interface to the Hardware Database 210. For example, an application can determine whether or not a particular product has analog output capability. If so, the user application can query the output types supported (voltage and/or current); and the user application can find out what output ranges it can use for each type.

Depending on which configuration parameter, or "attribute," an application desires to change, the Configuration Manager 202 sets the value in different ways. The application is not required to know how the Configuration Manager 202 sets the value. In the preferred embodiment, the Configuration Manager 202 operates to set values as follows. If the attribute is system-specific, such as the IRQ level of a device, the Configuration Manager 202 sets the new value in the system using the NI System Settings Manager 222. Otherwise, the Configuration Manager 202 sets the new value in the current configuration file. Therefore, the Configuration Manager 202 is the programmatic interface to the Hardware Database 210, to a configuration file, and to the system settings. For example, an application can set the input mode of an analog input channel to unipolar, or it could set the name of an analog input channel to "Oven." The Configuration Manager 202 returns an error if the new value is not valid for the specified attribute.

Depending on which configuration parameter, or "attribute," an application requests, the Configuration Manager 202 retrieves the current value in different ways. Again, the application does not need to know how the Configuration Manager 202 finds the information. If the attribute is system-specific, the Configuration Manager 202 gets the current setting from the system via the NI System Settings Manager 202. Otherwise, the Configuration Manager 202 examines the current configuration file 224 for the attribute's current setting. The Configuration Manager 202 will not find the attribute in the configuration file 224 if the attribute has never been changed from its default value. In this case, the Configuration Manager 202 retrieves the default value from the Hardware Database 210.

An application can also direct the Configuration Manager 202 to check the validity of the current configuration. The Configuration Manager 202 includes a set of "rules" at different levels to test relationships between all the attribute values. The Configuration Manager 202 returns a list of the errors that it finds in the current configuration, if any.

The following flowcharts describe the operation of the Configuration Manager 202 in more detail.

FIG. 5—Start Up

Figure 5:
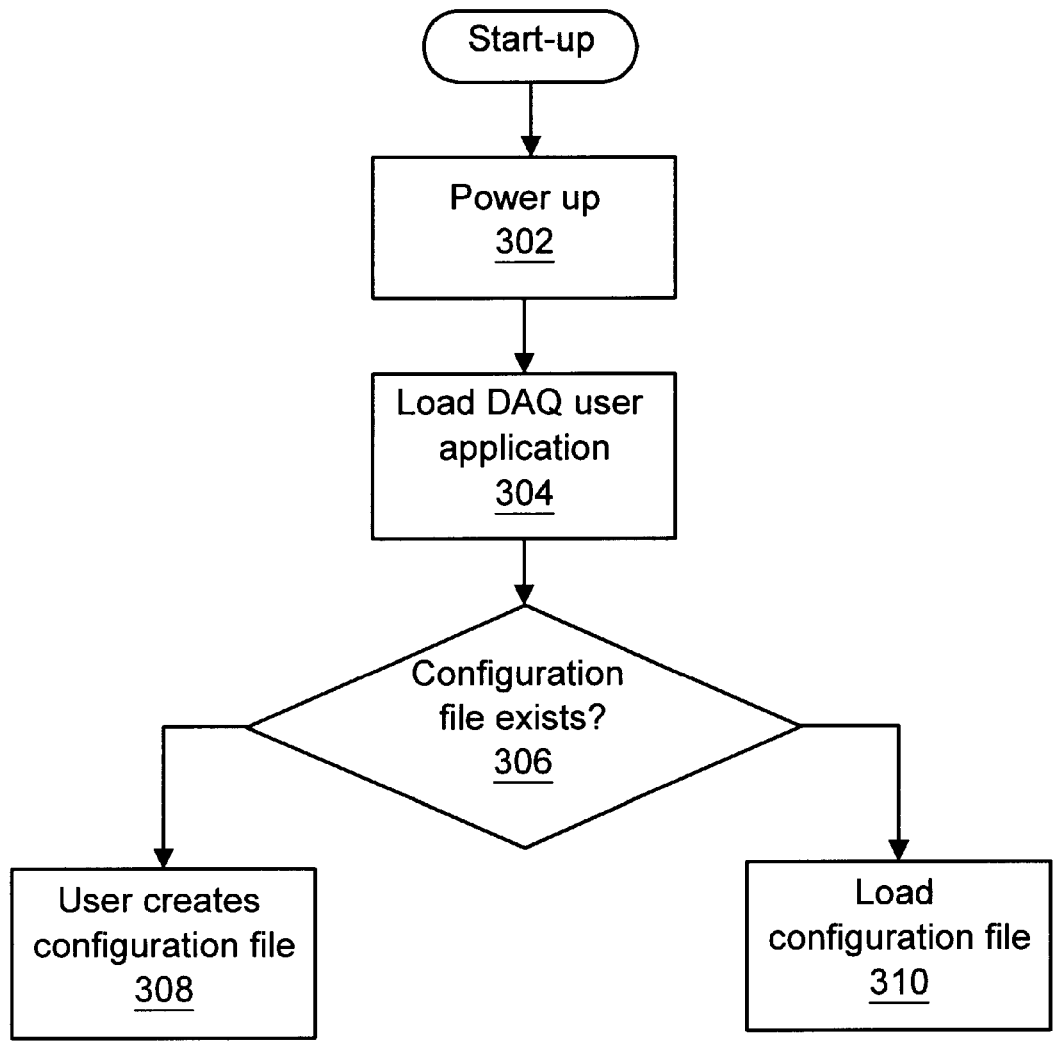
FIG. 5 is a flowchart illustrating start-up of a system and loading of a configuration file.

FIG. 5 is a flowchart diagram illustrating operation whereby the computer system 102 is powered up and the configuration utility 208 loads the configuration file 224 if the configuration file 224 exists, or the user has the option of creating a configuration file 224 for the computer system 102.

As shown, in step 302 the computer 102 powers up, in response to the user providing power to the computer system. In step 304 the data acquisition user application is loaded into the computer system memory 146. As discussed above, the DAQ user application can be various applications such as LabVIEW, LabWindows CVI, the DAQ Channel Wizard, etc.

In step 306 the Configuration Manager 202 determines if a configuration file 224 exists. In general, a configuration file 224 will exist when the user has previously created or configured a desired configuration file 224 to configure the DAQ system 100. If a configuration file 224 is determined to exist in step 306, then in step 310 the Configuration Manager 202 loads the configuration file 224 into system memory 146. This also involves using the information in the configuration file 224 to configure the DAQ system 100. For example, the configuration file 224 may include desired settings of DAQ hardware or desired parameters for other DAQ objects within the system which are different than the default settings of these DAQ objects. In step 310 the Configuration Manager 202 operates to configure the various DAQ objects according to the information in the configuration file 224.

If the configuration file 224 is determined to not exist in step 306, then in step 308 the user is presented with an option to create a configuration file 224. If the user desires to create a configuration file 224 in step 308, the user preferably launches the configuration utility program 208 to create a desired configuration.

Figure 6:
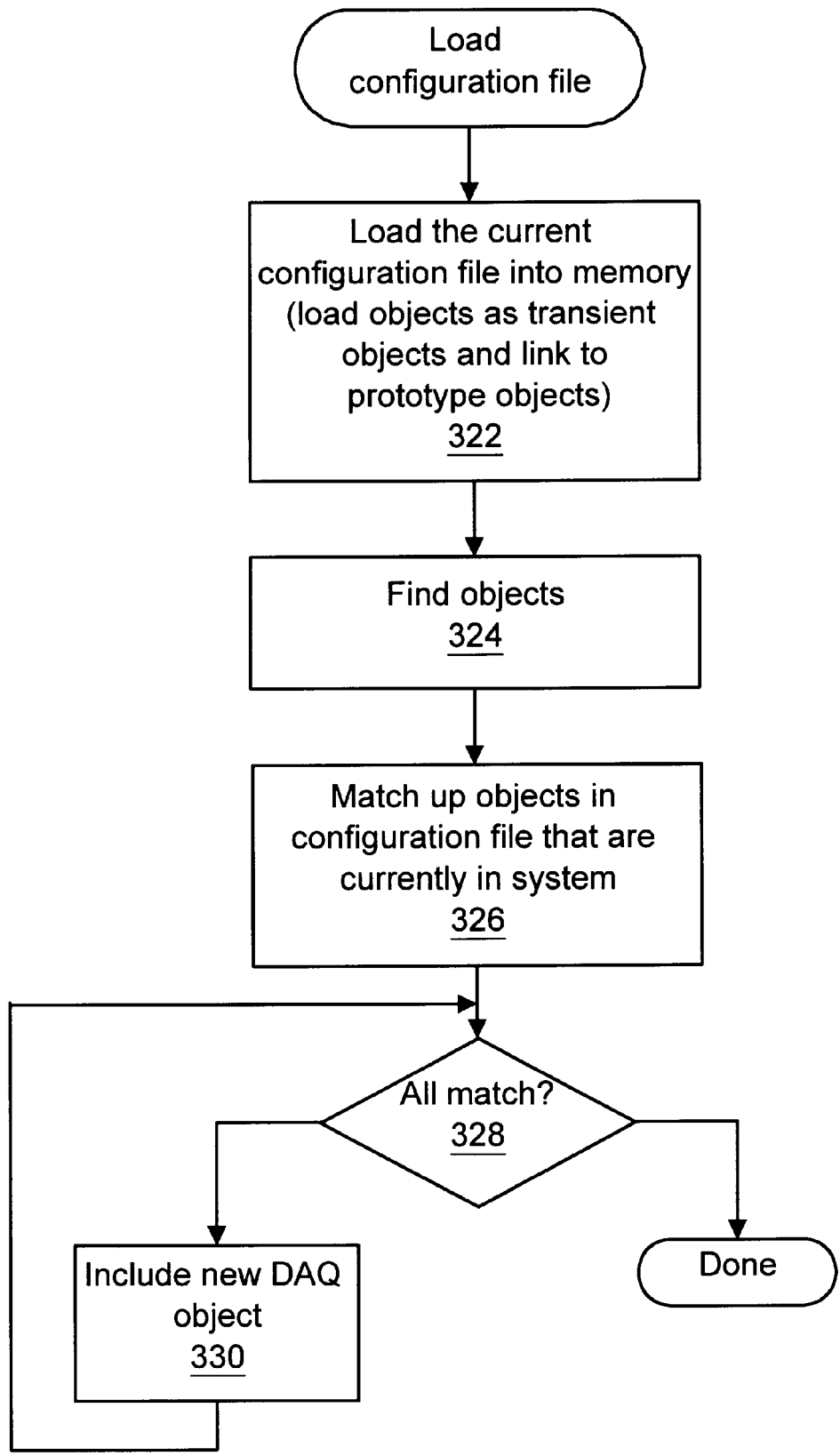
FIG. 6 is a flowchart illustrating the Configuration Manager loading a configuration file.

FIG. 6—Load Configuration File

FIG. 6 is a flowchart diagram illustrating step 310 of FIG. 5, i.e., illustrating loading of a configuration file 224. As shown, in step 322 the Configuration Manager 202 operates to load the current configuration file into system memory 146. This involves loading objects in the configuration file as transient objects and linking the transient objects to prototype objects.

The term "transient object" refers to an object which is temporarily stored in system memory 146 and which includes information on settings of respective DAQ objects. A transient object includes in-memory attributes or parameters which are not persistent until the transient object is saved. The term "prototype object" refers to the DAQ object and its associated information stored in the hardware database 210, wherein the hardware database 210 comprises the default values and capabilities of the DAQ object. The prototype object is an object in memory that encapsulates information about the persistent state of objects in the hardware database 210. Stated another way, the prototype object essentially is a placeholder for static attributes of an object whose physical data resides in the hardware database 210. Thus, the transient object in system memory 146 stores the settings which are changed from the default settings, and the transient object maintains the link back to the prototype object in the hardware database 210.

In step 324 the Configuration Manager 202 operates to find the objects in the configuration file. The operation of finding objects is discussed in more detail in the flowchart of FIG. 15.

In step 326 the Configuration Manager 202 operates to match up objects in the configuration file with the hardware or DAQ objects that are currently in the system. Thus, in step 326 the Configuration Manager 202 determines whether, for every DAQ software object in the configuration file which has been loaded into memory 146, there is a corresponding DAQ object such as a channel object or a hardware device, such as a DAQ interface card 104, present in the DAQ system 100. For example, if the configuration file includes desired settings for a DAQ hardware interface card 104, but yet the DAQ interface card 104 has been removed from the DAQ system 100, then it is necessary to determine this because the configuration file could not be properly loaded in this instance.

In step 328 the Configuration Manager 202 determines if all of the software objects in the configuration file match all of the corresponding objects present in the DAQ system. If all match as determined in step 328, then operation completes. If all of the objects are determined to not match in step 328 then in step 330 the Configuration Manager 202 performs operations to include a new DAQ object within the DAQ system 100. Thus, for example, if a new DAQ hardware device has been added to the computer system 102, either the plug and play software comprised in the computer system 102 will detect this device, or the user will be required to input information regarding the presence of this device. In either case, when the Configuration Manager 202 learns of the new DAQ object, the Configuration Manager 202 performs operations in step 330 to include the new DAQ object within the DAQ system 100.

Figure 7:
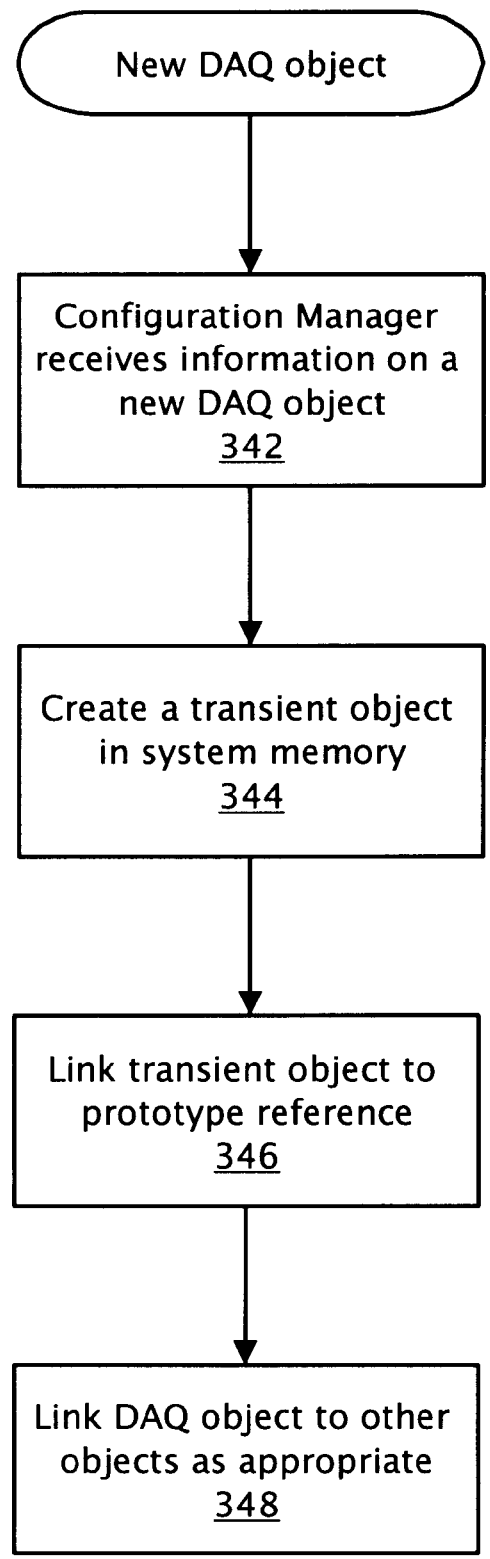
FIG. 7 is a flowchart illustrating the Configuration Manager loading a new DAQ object in the system.

FIG. 7—New DAQ Object

FIG. 7 is a flowchart diagram illustrating operation of the Configuration Manager 202 incorporating a new DAQ object in the system according to the preferred embodiment. As shown, in step 342 the Configuration Manager 202 receives information on a new DAQ object. For example, when the user installs a new data acquisition (DAQ) board 104 in a computer system 102, and then boots the computer system 102, the plug and play software will typically detect the new DAQ board 104 comprised in the computer system and provide information on the new DAQ board 104 to the Configuration Manager 202. As another example, the user can use the DAQ channel Wizard 206 to create a virtual channel, which essentially is a configuration of a DAQ channel, wherein the virtual channel comprises a new DAQ object. This new DAQ object is then provided to the Configuration Manager 202. If the user adds an SCXI chassis 122 or SCXI module 124, the user may be required to provide input to notify the system of the new device.

After receiving information on a new DAQ object in step 342, in step 344 the Configuration Manager 202 creates a transient object for the DAQ object in system memory 146. The transient object is created in system memory 146 to store configuration information on the new DAQ object. In step 346 the Configuration Manager 202 links the transient object to a prototype reference. The prototype reference comprises a pointer to the configuration information of the DAQ object stored in the hardware database 210. The hardware database 210 typically stores the default settings and capabilities of the DAQ object. It is noted that the hardware database 210 does not store information on virtual channels created using the Channel Wizard.

Once the transient object has been created in step 344 and has been linked to the prototype reference in step 346, then in step 348 the Configuration Manager 202 links the DAQ object to other objects as appropriate.

Once the new DAQ object has been included, the user application can then communicate with the Configuration Manager 202 to access configuration parameters or attributes, obtain default settings, and determine capabilities. As discussed further below, when the user application desires to access configuration information using the Configuration Manager 202, this access is performed using the transient object if the desired parameters to be accessed have been modified and there exist in the transient object in system memory 146. If values for these parameters have not been modified and thus are not stored in the transient object, then the information is obtained from the hardware data base 210.

Figure 8:
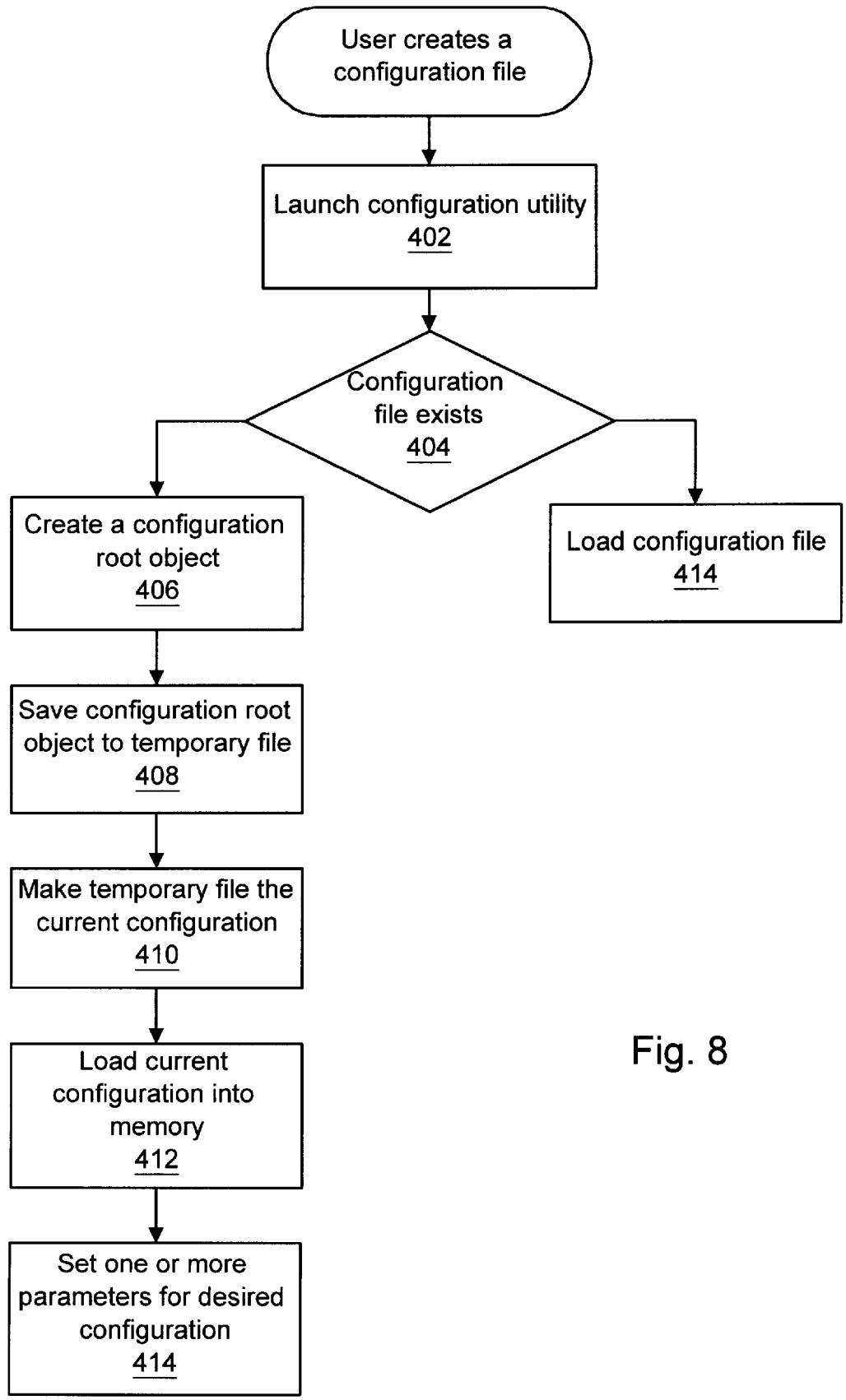
FIG. 8 is a flowchart illustrating a configuration utility creating a configuration file in response to user input.

FIG. 8—User Creates a Configuration File

FIG. 8 is a flowchart diagram illustrating operation of the configuration utility 208 being used to create a configuration file. As shown, in step 402 the user launches the configuration utility 208. This causes the configuration utility application 208 to be executed in the computer system 102. It is noted that steps 404–416 in FIG. 8 are performed by the configuration utility 208 making calls to the Configuration Manager 202, i.e., the Configuration Manager 202 performs many of the operations in FIG. 8.

After the configuration utility 208 is launched in step 402, in step 404 the configuration utility 208 determines if a configuration file exists. If a configuration file is determined to exist in step 404, then in step 414 the configuration utility 208 loads the configuration file and operation completes.

If the configuration file is determined to not exist in step 404, then in step 406 the configuration utility 208 creates a configuration root object. In step 408 the configuration utility 208 saves the configuration root object to a temporary file. In step 410 the configuration utility 208 makes the temporary file the current configuration. Thus, in steps 406–410, the configuration utility has essentially created a template or blank object which will be used to store the current configuration.

In step 410 the configuration utility 208 calls the Configuration Manager 202 to load the configuration and the Configuration Manager 242 perform steps 322–330 in the flowchart of FIG. 6. Thus in step 412 the configuration utility 208 receives input from the Configuration Manager 202 to create the desired configuration.

In step 414, the user enters desired settings for DAQ objects within the system. These new settings will typically be different than the default settings stored in the hardware database 210. The user may also inform the configuration utility 208 of undetected DAQ objects in the system, such as an SCXI card, which are then added to the system using the method of FIG. 7.

Figure 9:
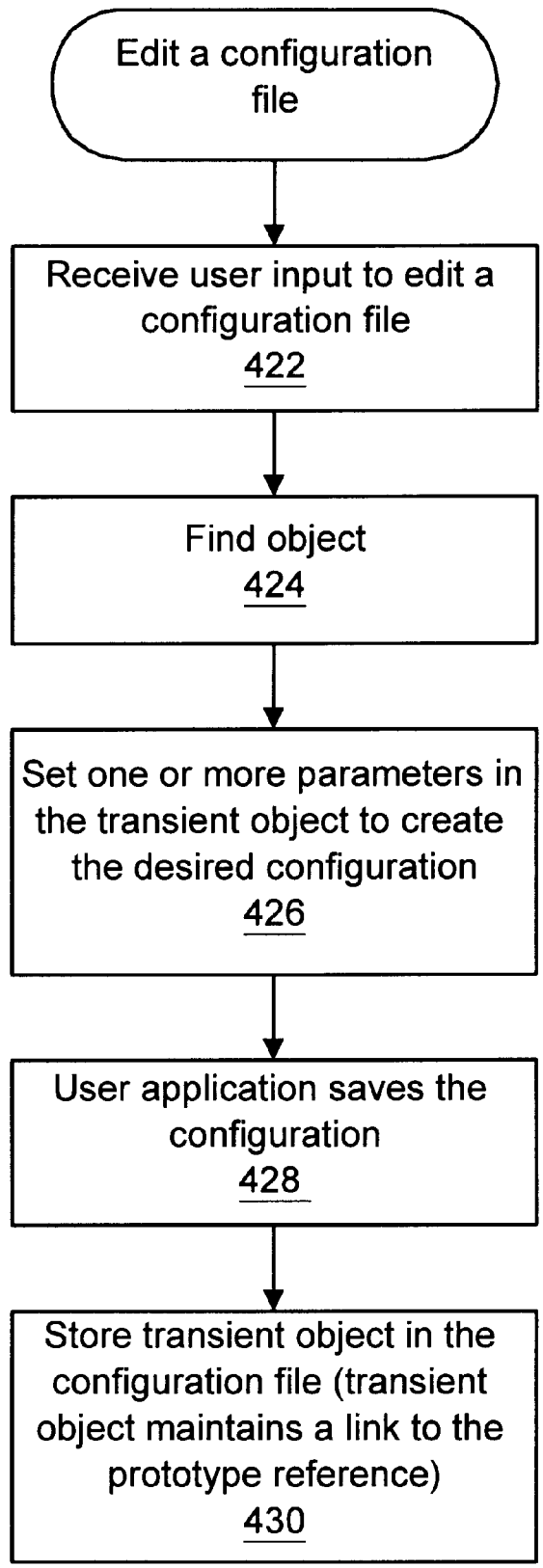
FIG. 9 is a flowchart illustrating the Configuration Manager editing a configuration file in response to user input.

FIG. 9—User Edits a Configuration File

FIG. 9 is a flowchart diagram illustrating operation of editing a configuration file. It is noted that steps 424–430 in FIG. 9 are performed by the configuration utility 208 making calls to the Configuration Manager 202. As shown, in step 422 the configuration utility 208 receives user input to edit a configuration file. This may comprise the user launching the configuration utility 208 and selecting an option to edit a current existing configuration file. In step 422 user input is also received to edit one or more specific objects within the configuration file.

In step 424 the Configuration Manager 208 finds the object desired to be edited. As discussed above, the find object method is discussed with reference to the flowchart of FIG. 15.

In step 426 the configuration utility 208, through the Configuration Manager 202, sets one or more parameters in the transient object to create the desired configuration. In other words, in step 426 one or more parameter settings of the object are set in the transient object in system memory 146 to create or edit the desired configuration. Thus the user sets one or more values for the parameters which are different than the default values in order to create a desired configuration for the DAQ object. Setting of parameters involves storing these new parameter values in the transient object. It is noted that steps 422–426 may be executed one or more times to edit the parameters of any number of objects as desired.

Once the user has edited the desired objects in the configuration file in steps 422–426, in step 428 the user application saves the configuration. More specifically, user input is received by the computer system 102 to save the configuration.

In step 430 the Configuration Manager 208 stores the transient object in the configuration file 224. Thus, the transient object which has received changes to one or more parameters is then stored in the configuration file to complete the editing of the configuration file. It is noted that the transient object maintains the link to the prototype object in the hardware database 210.

Figure 10:
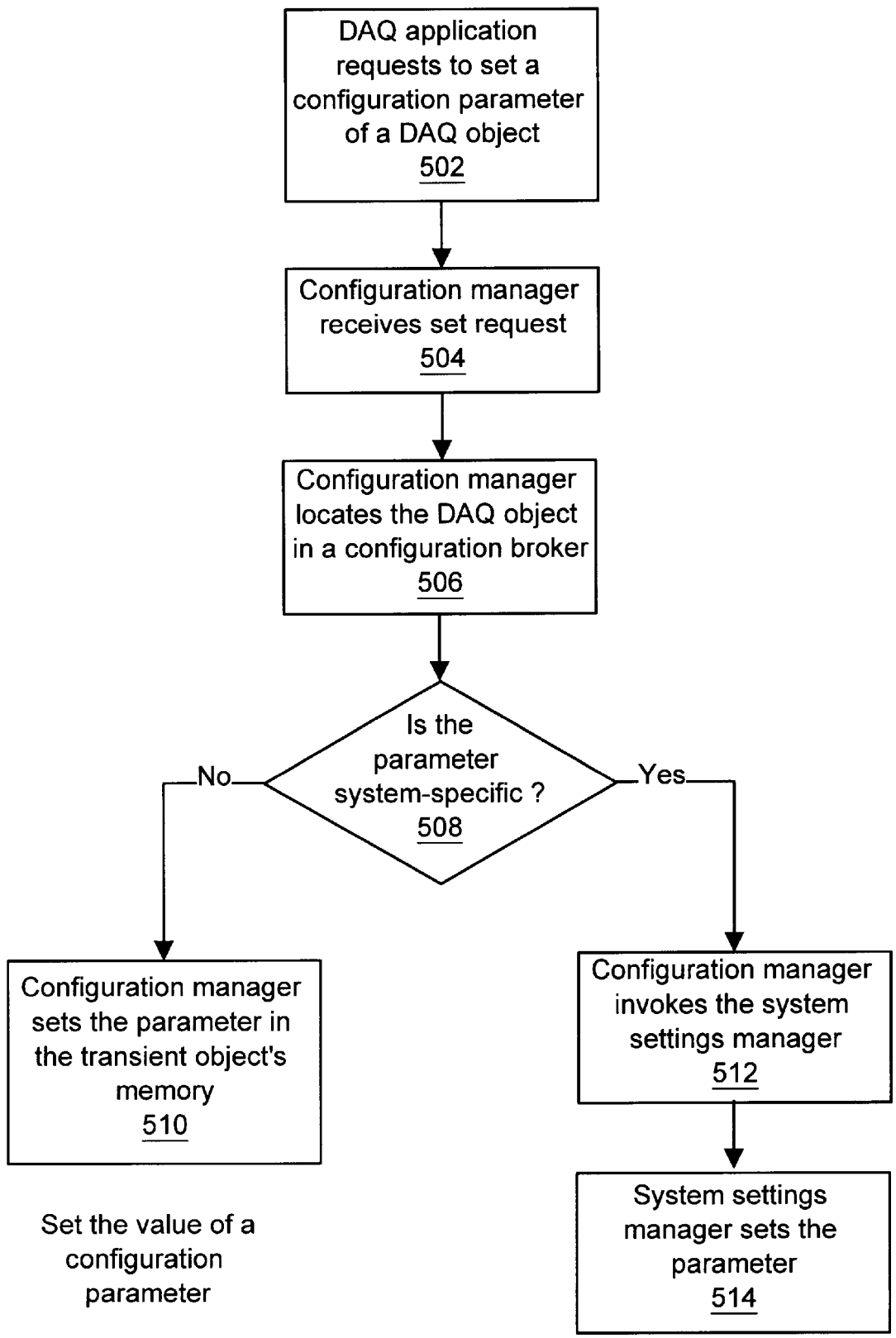
FIG. 10 is a flowchart illustrating the Configuration Manager setting the value of a configuration parameter.

FIG. 10—User Application Sets the Value of a Configuration Parameter

FIG. 10 is a flowchart diagram illustrating operation of setting of value of a configuration parameter. As shown in step 502 the DAQ application requests to set a configuration parameter of a DAQ object. This may involve the configuration utility 208 attempting to set a configuration parameter to create a desired configuration. This may also involve other various types of DAQ applications mentioned above requesting to set a configuration parameter of a DAQ object.

In step 504 the Configuration Manager 202 receives the set request. In step 506 the Configuration Manager 202 locates the DAQ object in a configuration broker. Step 506 preferably comprises the find object routine which is described with respect to the flowchart of FIG. 15.

In step 508 the Configuration Manager 202 determines if the parameter is system-specific. Examples of system-specific parameters include IRQ level, port number, slot number for PCI, base addresses, and memory address window, among others. If the parameter is not system-specific, then in step 510 the Configuration Manager 202 sets the parameter in the transient object's memory. Here since the parameter is being changed from its default setting, the Configuration Manager 202 stores the changed value in the transient object in the system memory 146, and stores the transient object in the current configuration file.

If the parameter is determined to be system-specific in step 508, then in step 512 the Configuration Manager 202 invokes the system settings manager 222. In step 514 the systems setting manager 222 sets the parameter, and operation completes.

Figure 11:
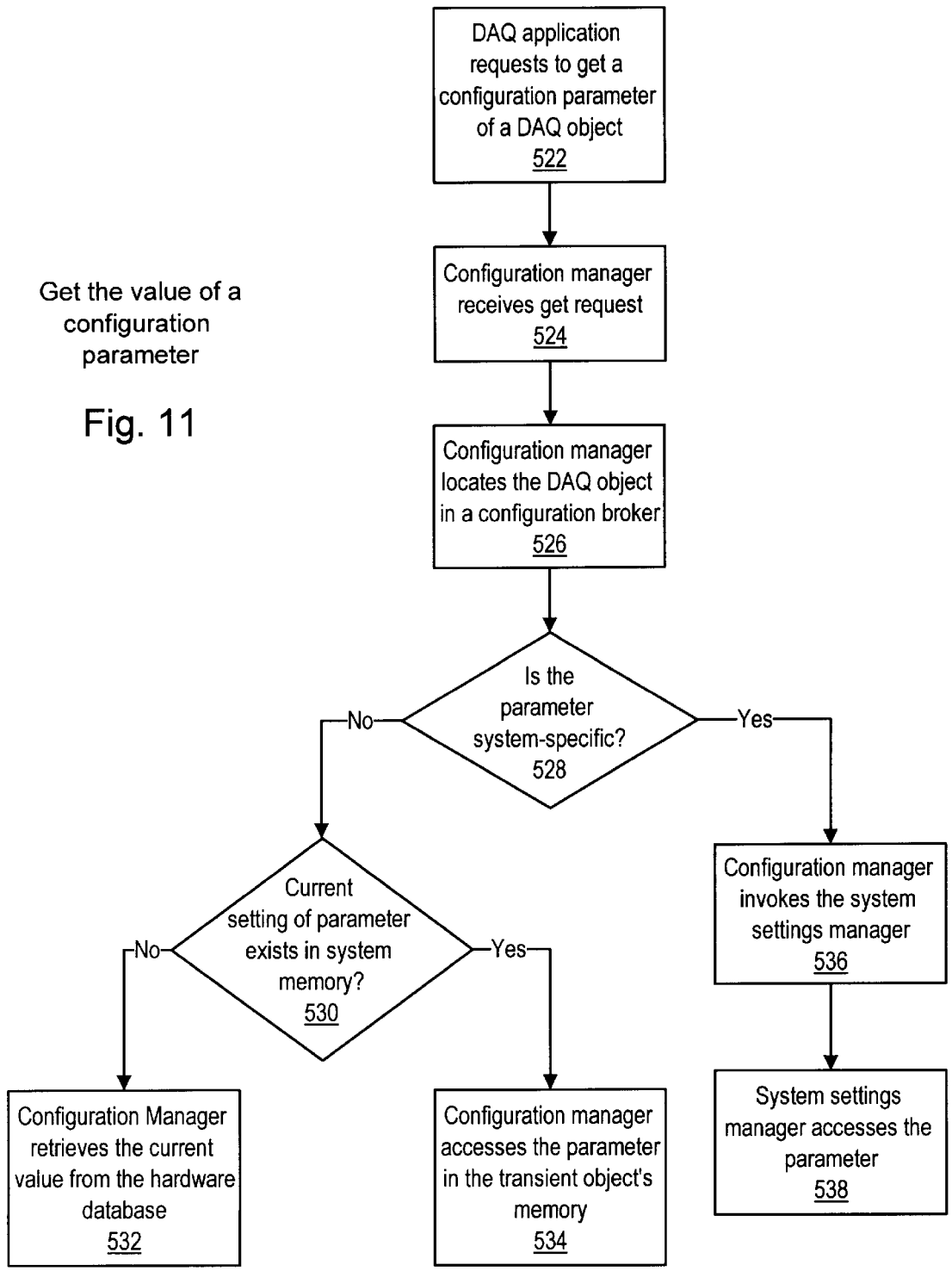
FIG. 11 is a flowchart illustrating the Configuration Manager getting the value of a configuration parameter.

FIG. 11—User Application Gets the Value of a Configuration Parameter

FIG. 11 is a flowchart diagram illustrating the operation of getting the value of a configuration parameter. As shown, in step 522 the DAQ application requests to get a configuration parameter of a DAQ object. As described above with respect to step 502, the DAQ application may be the configuration utility 208 or may be another type of DAQ application.

In step 524 the Configuration Manager 202 receives the get request. In step 526 the Configuration Manager 202 locates the DAQ object in a configuration broker, i.e., finds the DAQ object. The find DAQ object routine is discussed with respect to FIG. 15.

In step 528 the Configuration Manager 202 determines if the parameter is system-specific. If not, then in step 530 the Configuration Manager 202 determines if the current setting of the parameter exists in the system memory 146. In general, the current setting of the parameter will exist in a transient object in the system memory 146 if the parameter has been changed from its default value. If the parameter has not been changed from its default value, then the parameter will not exist in the system memory 146 but rather resides in the hardware database 210. If the current setting of the parameter has been changed to a different value than its default value, and hence exists in a transient object in the system memory 146, then in step 534 the Configuration Manager 202 accesses the parameter from the transient object in the system memory 146. If the current setting of the parameter does not exist in the system memory 146, i.e., the parameter has not yet been changed from its default value, then in step 532 the Configuration Manager 202 retrieves the current value or default value of the parameter from the hardware database 210.

If the parameter is determined to be system-specific in step 528, then in step 536 the Configuration Manager 202 invokes the system settings manager 222. In step 538 the system settings manager 222 accesses the parameter to obtain the value of the system parameter.

Figure 12:
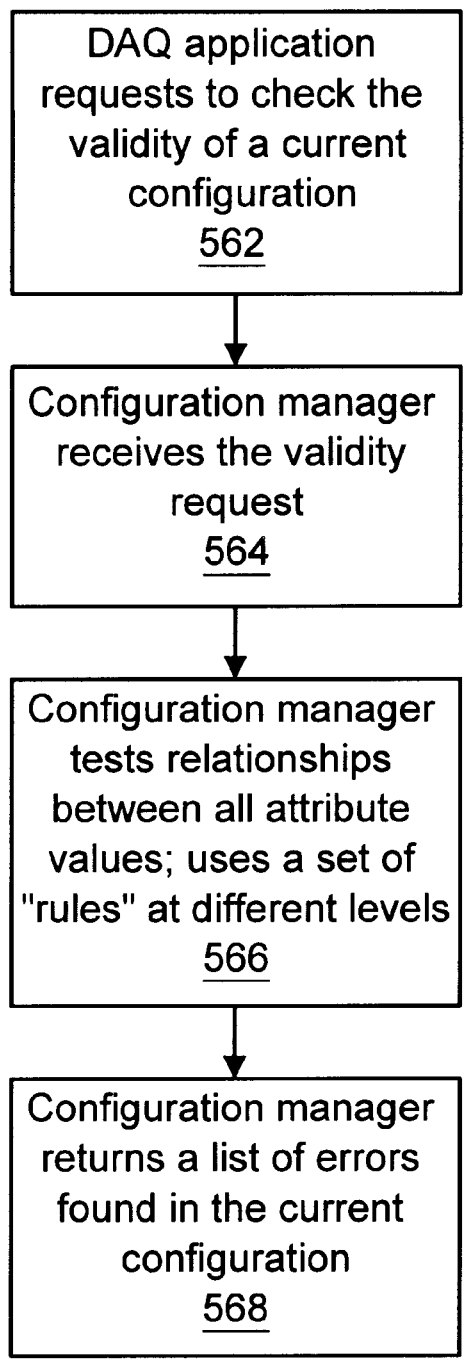
FIG. 12 is a flowchart illustrating the Configuration Manager checking the validity of current configuration settings.

FIG. 12—User Application Checks the Validity of Current Configuration Settings

FIG. 12 is a flowchart diagram illustrating operation when the DAQ application checks the validity of current configuration settings. As shown, in step 562 the DAQ user application requests to check the validity of a current configuration. In step 564 the Configuration Manager 202 receives the validity request. In step 566 the Configuration Manager 202 tests relationships between all attribute values. In the preferred embodiment, the Configuration Manager 202 uses a set of rules at different levels to test the relationships between the attribute or parameter values. In step 568 the Configuration Manager 202 returns a list of any errors found in the current configuration.

Figure 13:
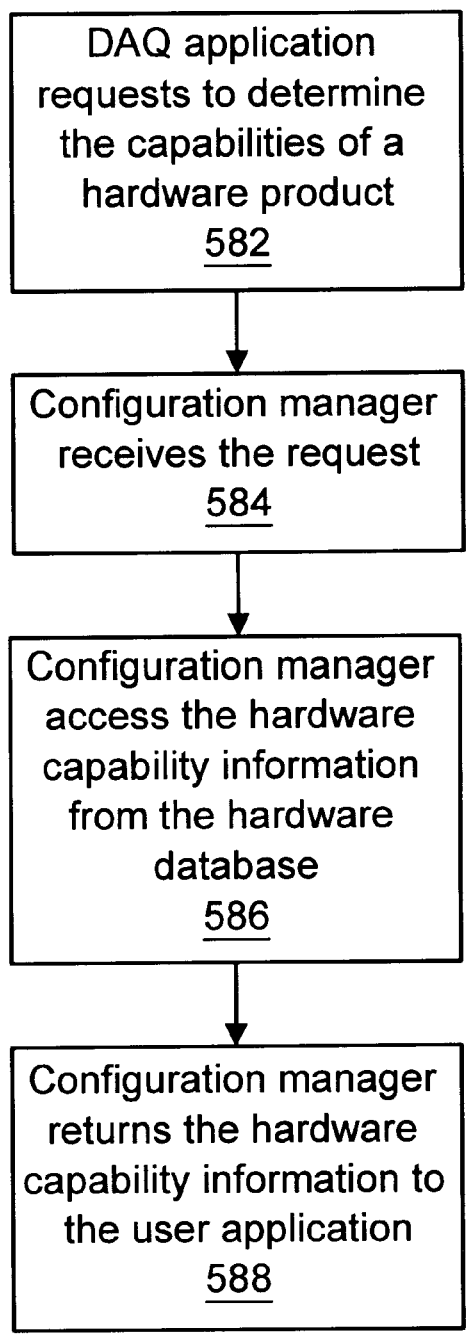
FIG. 13 is a flowchart illustrating the Configuration Manager determining the capabilities of a hardware product.

FIG. 13—User Application Determines Capabilities of a DAQ Hardware Product

FIG. 13 is a flowchart diagram illustrating operation when the DAQ application determines the capabilities of a hardware product. As shown, in step 582 the DAQ user application requests to determine the capabilities of a DAQ object such as a hardware product. In step 584 the Configuration Manager 202 receives the request. In step 586 the Configuration Manager 202 accesses the hardware capability information from the hardware database 210. In step 568 the Configuration Manager 202 returns the hardware capability information to the user application.

Figure 14:
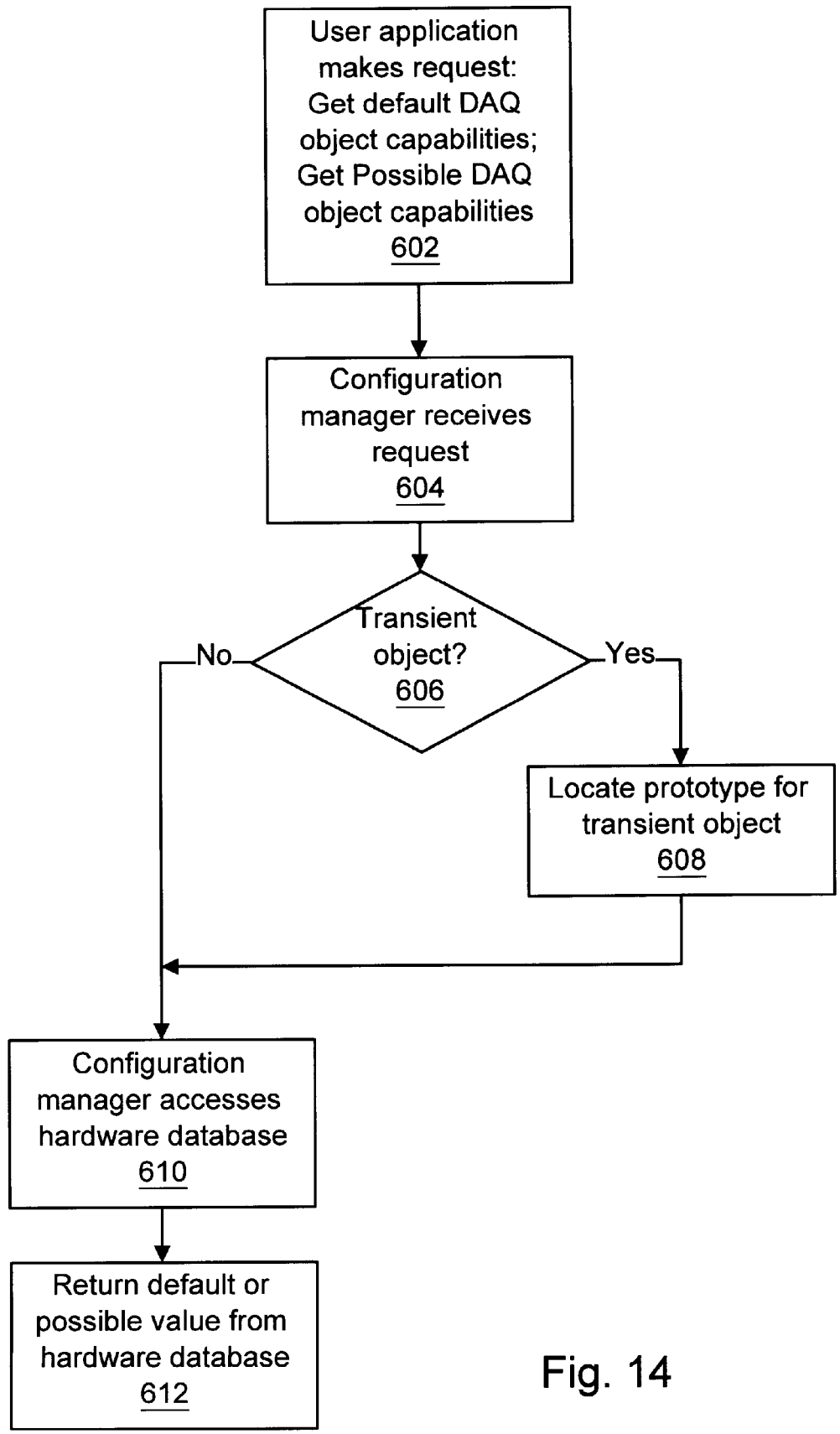
FIG. 14 is a flowchart illustrating the Configuration Manager determining default or possible capabilities of a DAQ object.

FIG. 14—Request to Get Default or Possible Capabilities of a DAQ Object

FIG. 14 is a flowchart diagram which illustrates operation of the Configuration Manager 202 when the user application makes a request to either get the default DAQ object capabilities of a DAQ object or device, or to get the possible DAQ object capabilities of a DAQ object or device.

As shown, in step 602 the user application makes a request. This request can be either to get the default DAQ object capabilities from the hardware database 210 or get a list of the possible DAQ object capabilities from the hardware database 210. In other words, the user application can either request to get the default settings or the possible capabilities of a DAQ object.

In step 604 the Configuration Manager 202 receives the request. In step 606 the Configuration Manager 202 determines if a transient object exists for the DAQ object upon which the request has been made. If a transient object does not exist as determined in step 606, then operation proceeds to step 610 to obtain the information from the hardware database. If a transient object exists as determined in step 606, then in step 608 the Configuration Manager 202 locates the prototype for the transient object, i.e., uses a pointer or reference to obtain the location of the respective object in the hardware database 210. After step 608, operation proceeds to step 610.

In step 610 the Configuration Manager 202 accesses the hardware database 210 to obtain information regarding the DAQ object from the hardware database 210. In step 612 the Configuration Manager 202 returns the default settings or the possible capabilities of the DAQ object from the hardware database 210.

Figure 15:
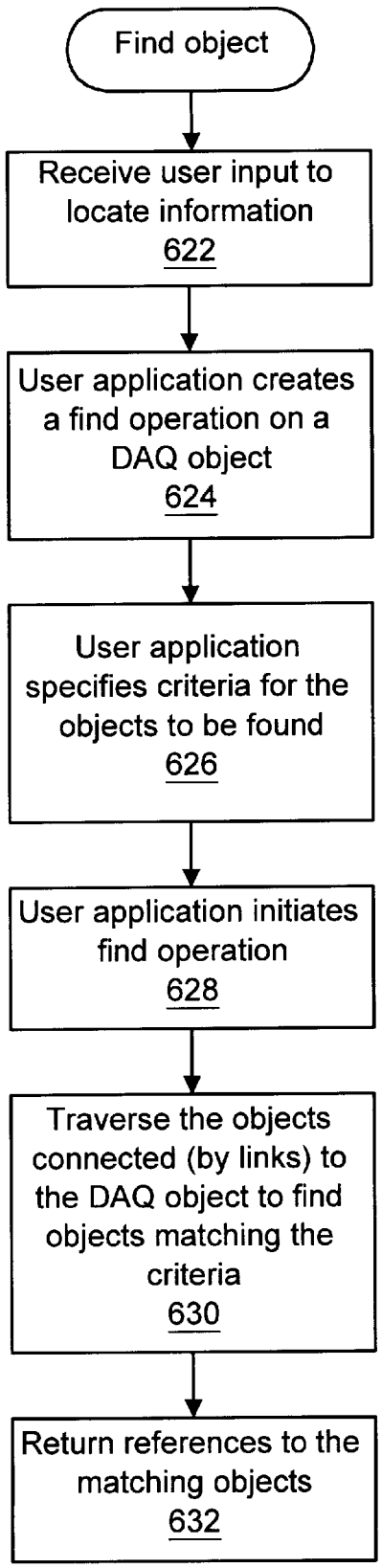
FIG. 15 is a flowchart illustrating the Configuration Manager finding an object.

FIG. 15—Finding an Object

FIG. 15 is a flowchart diagram illustrating operation of the find object method performed by the Configuration Manager 202 to locate an object. As show, in step 622 the computer system 102 receives user input to locate information regarding a DAQ object. In step 624 a user application executing in the computer system 102 creates a find operation on a DAQ object in response to the user input in step 622. In step 626 the user application specifies criteria for the objects to be found. This criteria may include what links to follow when searching for the object, i.e., search through, connect-to links, child links, and measured-by links, among others. The criteria may also include specifications of the values of the parameters, such as the parameter being equal to, less than, greater than, or not equal to a given value. In step 628 the user application initiates the find operation. In step 630, in response to the find operation being initiated by the user application, the Configuration Manager 202 traverses the objects connected by links to the DAQ object to find objects matching the criteria. In step 632 the Configuration Manager 202 returns references to the matching objects.

Figure 16:
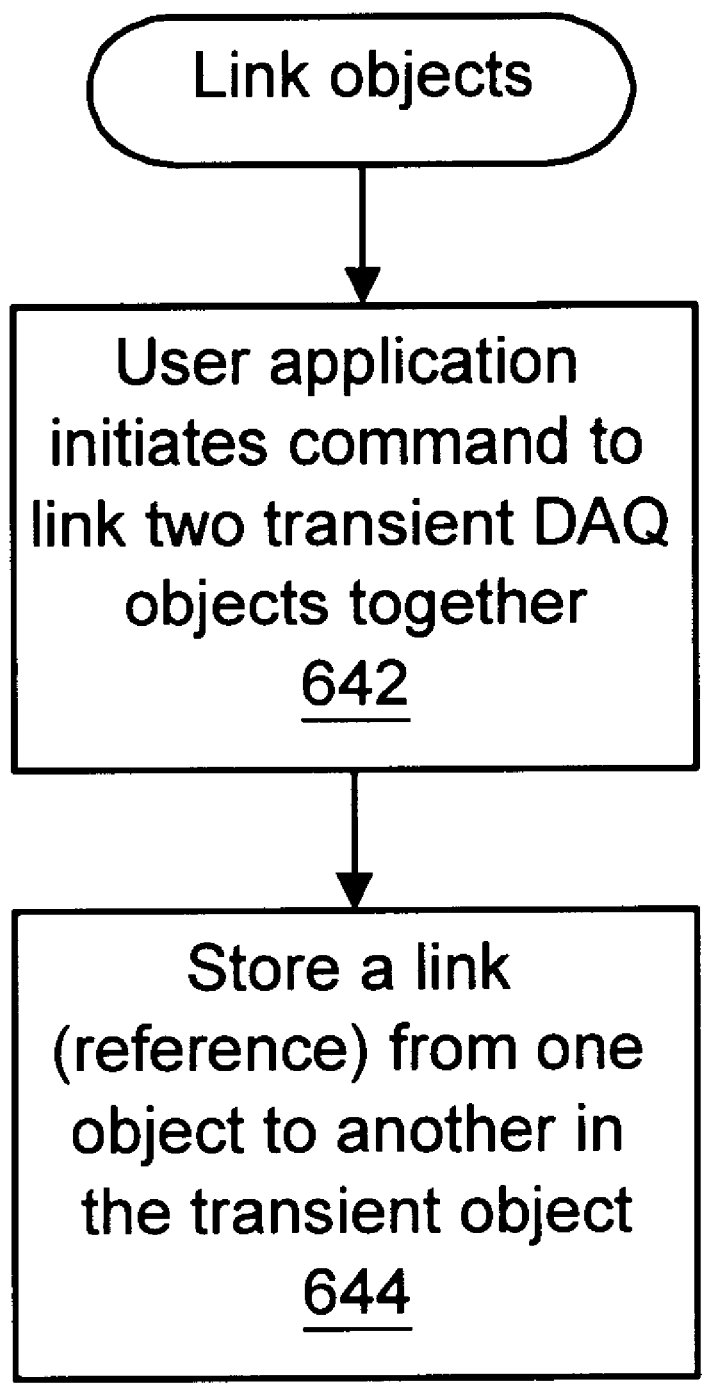
FIG. 16 is a flowchart illustrating the Configuration Manager linking objects.

FIG. 16—Linking an Object

FIG. 16 is a flowchart diagram illustrating the operation of linking objects. As shown, in step 642 a user application initiates a command to link two transient DAQ objects together. In step 644 the Configuration Manager 202 stores a link or reference from one object to another in the transient object in response to the command in step 642.

Figure 17:
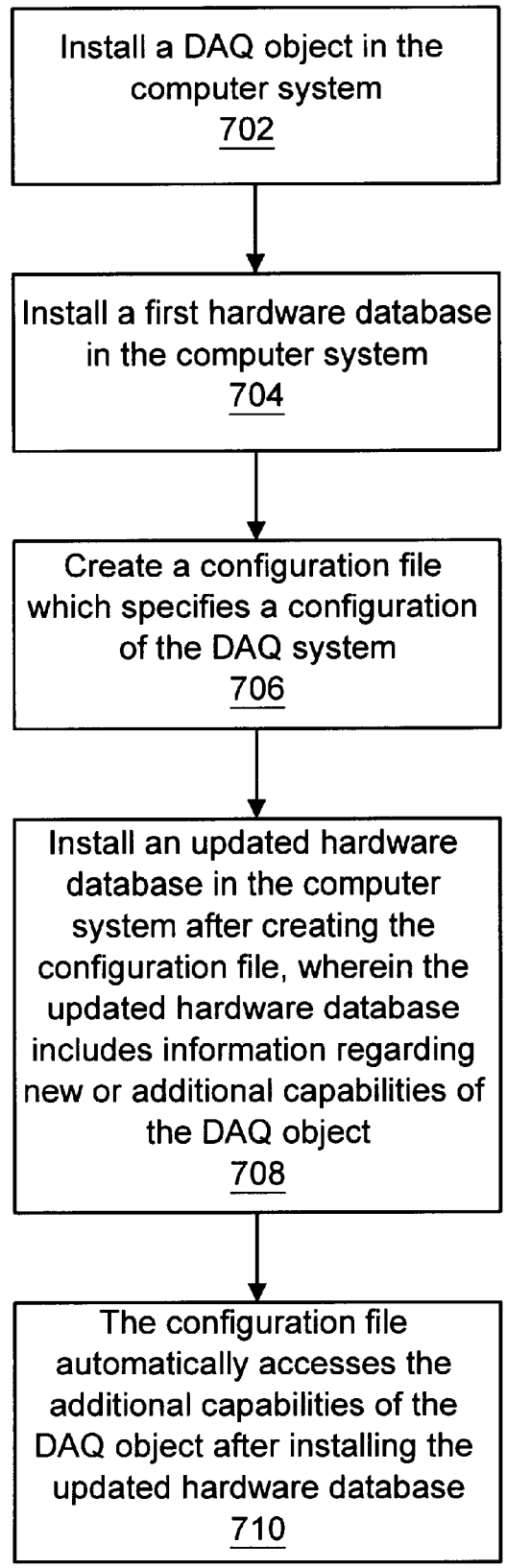
FIGS. 17 and 18 are flowcharts illustrating a configuration file automatically accessing new or newly supported capabilities of a DAQ object.
Figure 18:
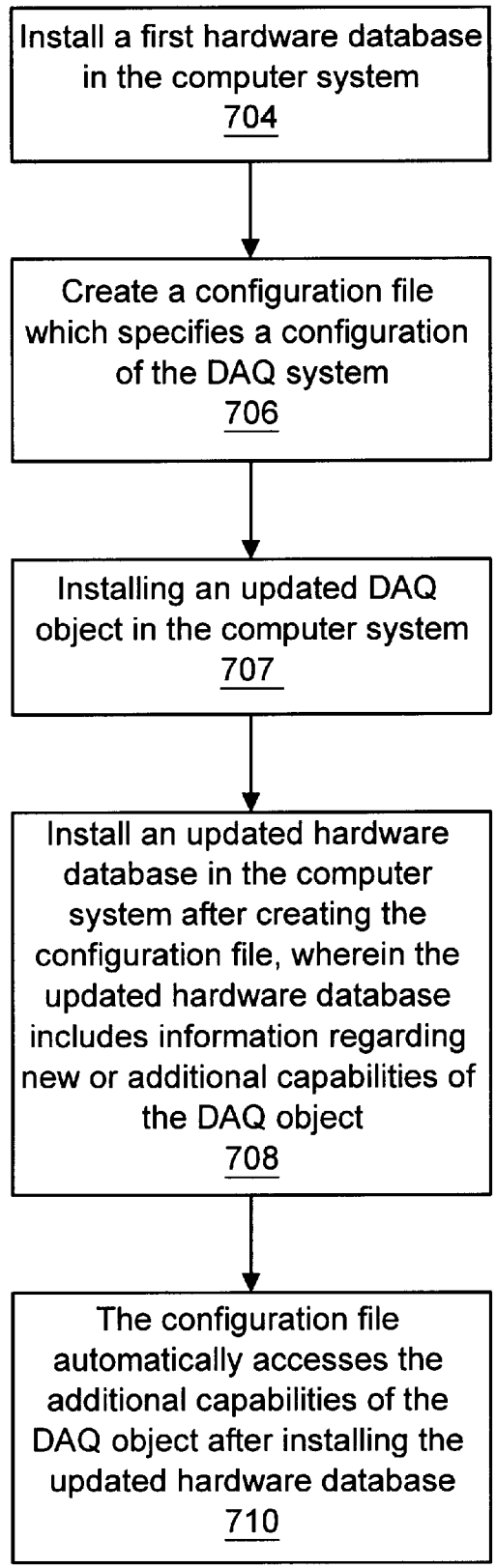
Figure 19:
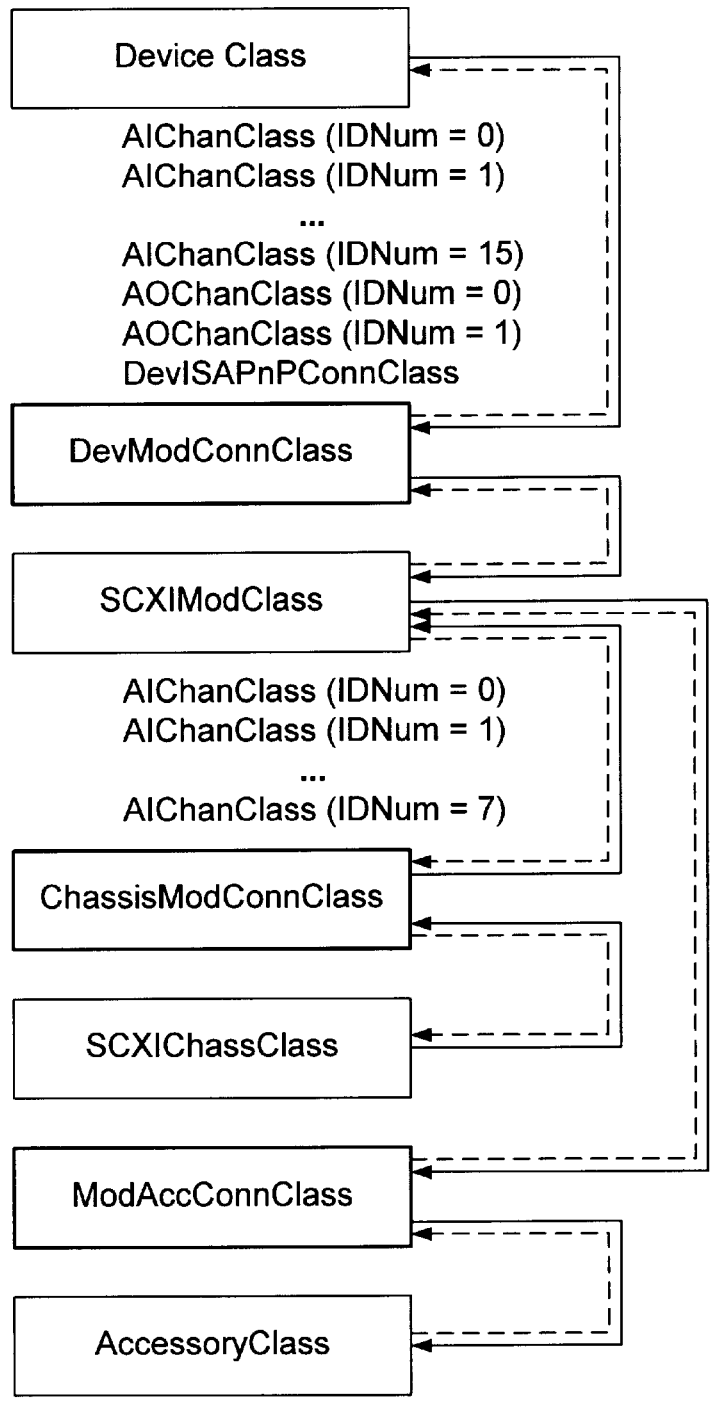
FIG. 19 illustrates links between objects, including parent-child links and links between objects which represent physical connections between hardware.

FIGS. 17 and 18—Transparently Accessing New Capabilities of DAQ Objects

FIG. 17 is a flowchart diagram illustrating a method for providing access to additional or new information on data acquisition (DAQ) objects in a DAQ system. As shown, in step 702 a DAQ object is installed in the computer system 102. The DAQ object may comprise a hardware device, such as a DAQ interface card 104 or SCXI device, or may comprise software, such as a virtual channel configuration created by the DAQ Channel Wizard 206.

In step 704 a first hardware database is installed in the computer system 102. The first hardware database includes information on certain capabilities of the DAQ object, but may not include information on some (unsupported) capabilities of the DAQ object.

In step 706 the user and/or a user application creates a configuration file which specifies a configuration of the DAQ system. The configuration file is created using the first hardware database. The configuration file also may include settings, i.e., specified parameter values, for the DAQ object.

After the time that the configuration file is created in step 706, the company which developed the DAQ object may decide to provide software support for additional features in the DAQ object. In other words, the company may decide to support additional features in the DAQ object which were previously unsupported in the DAQ object. For example, if the DAQ object is a DAQ interface card, and the company decides to provide software support for certain previously unsupported features or capabilities, the company would update the first hardware database with these additional unsupported features or capabilities to create an updated database.

When the user of the DAQ system 100 receives an updated database, the user installs the updated hardware database in the computer system 102. Thus the updated hardware database is installed after the configuration file was created in step 706. The updated hardware database includes information regarding additional capabilities of the DAQ object, e.g., includes one or more additional parameters for the DAQ object.

When the previously created configuration file is used, the configuration file can be used to automatically access the additional capabilities of the DAQ object from the installed updated hardware database, i.e., the configuration file can be used to obtain information on the additional capabilities of the DAQ object from the updated hardware database. A DAQ application can use the configuration file to preferably automatically access the additional capabilities of the DAQ object utilizing the services of the Configuration Manager 202. This is accomplished by the transient objects establishing links to the prototype objects, which now refer to the updated capabilities in the updated hardware database. It is noted that the configuration file is not required to be modified in order to automatically access the additional capabilities of the DAQ object. Thus the new capabilities are accessed transparently to the user.

Referring now to FIG. 18, the method of the present invention is also operable to access new capabilities of updated DAQ objects which are installed in the computer system 102. In FIG. 18, steps which are similar or identical to those in FIG. 17 have the same reference numerals for convenience. In this situation an updated DAQ object is installed in the computer system in step 707 after creating the configuration file in step 706. The updated DAQ object comprises new capabilities not included in the first hardware database. The updated hardware database installed in step 708 of FIG. 18 includes information regarding the new capabilities of the updated DAQ object. In step 710 of FIG. 18, the configuration file is used to automatically access the new capabilities of the updated DAQ object after installing the updated hardware database and after installing the updated DAQ object.

Configuration Manager Clients

In the present embodiment, the Configuration Manager 202 is used by the following clients:
DAQ Configuration Utility
NI-DAQ 5.0
BridgeVIEW DAQ Server
Channel Wizard
LabVIEW Solution Wizard
ComponentWorks
VirtualBench It is noted that the Configuration Manager can be used with any of various types of clients, as desired

Configuration Objects and Attributes

The interface of the Configuration Manager 202 uses different kinds of objects that model the DAQ hardware. These objects are defined by their functionality and their attribute set. An object's functionality is determined by its C++ class implementation (its methods) in the Configuration Manager 202 An object's attributes are not determined by its C++ class implementation (its member variables) in the Configuration Manager 202. Instead, every object has an arbitrary list of attributes managed by the common C++ baseclass. The attributes that go on each object's list are specified in the Hardware Database 210. Therefore, objects with different behavior, such as different rules for verifying configuration settings, require instantiation of different C++ classes in the Configuration Manager 202. However, objects with different attributes can be instantiations of the same C++ class in the Configuration Manager 202.

Configuration Manager Object Inheritance

The class inheritance hierarchy can also be seen from two perspectives. First, the Configuration Manager class implementation determines the inheritance of functionality. That is, methods not specially implemented by a subclass are inherited from the baseclass. Secondly, the Hardware Database 210 specifies the inheritance of attributes. That is, attributes not present in the subclass are inherited from the baseclass. Common attributes can be kept in the baseclass and more specific attributes in the subclass. To the client of the Configuration Manager 202, every object appears to have all the functionality and attributes of its class and all its baseclasses.

Table 1 shows the class inheritance hierarchy from these two perspectives, showing subclasses indented one level from their baseclass. The object classes shown in boldface could be created and saved as part of a configuration file. The other object classes would never be instantiated as part of a configuration, but just provide common functionality and attributes for their subclasses.

The column on the left shows the inheritance of attributes as specified in the Hardware Database 210. The actual class names that a client of the Configuration Manager API would use are preferably prefixed by "kCfqVal"—for example, "kCfqValDeviceClass." (These and many other constants are defined in the header file cfqenum.h.) For example, the kCfqValAccessoryClass type of object has all the attributes specified for AccessoryClass in the Hardware Database 210, and also inherits the attributes from DAQProductClass and BasicObjClass.

The two columns in italics on the right show the corresponding C++ class that the Configuration Manager 202 would instantiate internally for that object; and the source files that implement that class. The C++ class determines the functionality of the object. For example, the Configuration Manager 202 would instantiate a kCfqValAccessoryClass type of object as its CfqProduct C++ class. The object has the functionality (methods) of the CfqProduct C++ class, and inherits functionality from its C++ baseclass, Basic-CfqObj. This implies that an AccessoryClass object has no special functionality, such as verification rules, beyond the basic DAQProductClass.

TABLE 1

Configuration Manager Object Inheritance

| Configuration Manager API Class | Internal C++ Class | Source Files (.h, .cpp) |
|---|---|---|
| BasicObjClass | *BasicCfqObj* | *cfqobj* |
|   SystemClass | *CfqSystemObject* | *systemcl* |
|   ConfigRootClass | *CfqRoot* | *cfqroot* |
|   HWDBRootClass | *BasicCfqObj* | *cfqobj* |
|   ScaleClass | *BasicCfqObj* | *cfqobj* |
|   DAQProductClass | *CfqProduct* | *cfqprod* |
|     AccessoryClass | *CfqProduct* | *cfqprod* |
|     DeviceClass | *CfqDevice* | *cfqdev* |
|     SCXIChassClass | *CfqProduct* | *cfqprod* |
|     SCXIModClass | *CfqProduct* | *cfqprod* |
| ChanClass | *BasicCfqObj* | *cfqobj* |
|   AIChanClass | *CfqAIChannel* | *cfqaichn* |
|   AOChanClass | *CfqAOChannel* | *cfqaochn* |
|   DIOChanClass | *BasicCfqObj* | *cfqobj* |
|   DIOLineClass | *BasicCfqObj* | *cfqobj* |
|   VAIChanClass | *BasicCfqObj* | *cfqobj* |
|   VAOChanClass | *BasicCfqObj* | *cfqobj* |
|   VDIOChanClass | *BasicCfqObj* | *cfqobj* |
| ConnClass | *CfqConn* | *cfqconn* |
|   OneOneConnClass | *CfqOneOneConn* | *cfqconn* |
|     ModModConnClass | *CfqModModConn* | *cfqconn* |
|   OneManyConnClass | *CfqOneManyConn* | *cfqconn* |
|     DevModConnClass | *CfqDevModConn* | *cfqconn* |
|     DevAccConnClass | *CfqDevAccConn* | *cfqconn* |
|     ModAccConnClass | *CfqModAccConn* | *cfqconn* |
|     ChassModConnClass | *CfqChassModConn* | *cfqconn* |
|   DevPCConnClass | *CfqDevPCConn* | *cfqpccon* |
|     DevEISAConnClass | *CfqDevPCConn* | *cfqpccon* |
|     DevISAConnClass | *CfqDevISAConn* | *isaconn* |
|     DevISAPnPConnClass | *CfqDevISAPnPConn* | *isapnpcn* |
|     DevMicroChannelConnClass | *CfqDevPCConn* | *cfqpccon* |
|     DevNECConnClass | *CfqDevNECConn* | *necconn* |
|     DevNECPnPConnClass | *CfqDevPCConn* | *cfqpccon* |
|     DevNuBusConnClass | *CfqDevPCConn* | *cfqpccon* |
|     DevParallelConnClass | *CfqDevLPTConn* | *lptconn* |
|     DevPCIConnClass | *CfqDevPCIConn* | *pciconn* |
|     DevPCMCIAConnClass | *CfqDevPCMCIAConn* | *pccardcn* |
|     DevSBusConnClass | *CfqDevPCConn* | *cfqpccon* |
|     DevSCXIConnClass | *CfqDevPCConn* | *cfqpccon* |
|     DevSerialConnClass | *CfqDevCOMConn* | *comconn* |
|     DevVXIConnClass | *CfqDevVXIConn* | *vxiconn* |

Configuration Manager Object Descriptions

Table 2 shows the same inheritance hierarchy and provides a short description of the Configuration Manager objects. Here again, the objects shown in boldface might be created and saved as part of a configuration file, but the others would not. Refer to the Attribute Dictionary to see all the attributes of each object.

TABLE 2

Configuration Manager Object Descriptions

| Configuration Manager API Class | Description |
| --- | --- |
| BasicObjClass | This is the baseclass of all the other objects. It provides common attributes, such as ID, and functionality, such as access to attributes. |
| SystemClass | This object represents the PC in which the hardware is installed. Its attributes include the bus type of the system. Currently, it has no special functionality, even though the Configuration Manager has an internal C++ class for it (CfqSystemObject). |
| ConfigRootClass | This object is at the root of every configuration hierarchy. It has only a few attributes, such as version numbers. |
| HWDBRootClass | This is the root of the Hardware Database hierarchy. It also has only a few attributes, such as version number. |
| ScaleClass | This object keeps the scaling information for virtual channels configured by the Channel Wizard. |
| DAQProductClass | This object provides common attributes and functionality for the four subclasses of products: devices, chassis, modules, and accessories. Currently, the DAQProduct class actually includes all attributes for all four of its subclasses, instead of the subclasses keeping attributes specific to them. This could be changed by adding what is referred to as attribute "shattering" or "scattering" to the Hardware Database parser (hwdbuild), but it is not necessary. |
| AccessoryClass | This object represents an accessory or terminal block. |
| DeviceClass | This object represents a plug-in or parallel-port device. |
| SCXIChassClass | This object represents an SCXI chassis. |
| SCXIModClass | This object represents an SCXI module. |
| ChanClass | Currently, this object is simply a baseclass for other channel objects, but has no attributes or functionality of its own. It could be useful for finding all channels of any type (see the kCfqClassEqual operator of the Find function). |
| AIChanClass | This object represents a single analog input channel of a product. Its IDNum attribute is the channel number. |
| AOChanClass | This object represents a single analog output channel of a product. Its IDNum attribute is the channel number. |
| DIOChanClass | This object could represent a single digital port of a product; however it is not used in the current release because all digital attributes are kept by the product object. |
| DIOLineClass | This object could represent a single digital line of a product; however it is not used in the current release because all digital attributes are kept by the product object. |
| VAIChanClass | When a virtual analog input channel is configured using the Channel Wizard, this object and a corresponding ScaleClass object keep the virtual channel attributes. |
| VAOChanClass | When a virtual analog output channel is configured using the Channel Wizard, this object and a corresponding ScaleClass object keep the virtual channel attributes. |
| VDIOChanClass | When a virtual digital channel is configured using the Channel Wizard, this object and a corresponding ScaleClass object keep the virtual channel attributes. |
| ConnClass | This baseclass provides the basic functionality for making and breaking connections, or "links," between objects. Relationships between objects is described in the next section. |
| OneOneConnClass | This baseclass provides functionality to connect exactly two objects of specific types. |
| ModModConnClass | This object represents a physical connection between two SCXI modules. |
| OneManyConnClass | This baseclass provides functionality to connect an object of one type to one or more objects of another type. |
| DevModConnClass | This object represents a physical connection between a device and one or more SCXI modules. |
| DevAccConnClass | This object represents a physical connection between a device and one or more accessories. |
| ModAccConnClass | This object represents a physical connection between an SCXI module and one or more accessories. |
| ChassModConnClass | This object represents a physical connection between an SCXI chassis and one or more SCXI modules installed in it. |

TABLE 2-continued

Configuration Manager Object Descriptions

| Configuration Manager API Class | Description |
| --- | --- |
| DevPCConnClass | This baseclass represents the connection between a device and the operating system of the PC. This class' implementation overrides the basic attribute functionality. It gets its attributes from the OS or sets them in the OS using the NI System Settings Manager (nissm). In addition, it provides functionality for recognizing the devices present in the system. All the following subclasses represent a particular kind of connection between a device and the PC, such as ISA Plug-and-Play, PCMCIA, or parallel port. Each subclass may have its own additional attributes and/or functionality. |
| DevEISAConnClass | |
| DevISAConnClass | |
| DevISAPnPConnClass | |
| DevMicroChannelConnClass | |
| DevNECConnClass | |
| DevNECPnPConnClass | |
| DevNuBusConnClass | |
| DevParallelConnClass | |
| DevPCIConnClass | |
| DevPCMCIAConnClass | |
| DevSBusConnClass | |
| DevSCXIConnClass | |
| DevSerialConnClass | |
| DevVXIConnClass | |

Configuration Object Organization

A user's configuration is a hierarchy of objects that were originally copied from the "default" or "prototype" object in the Hardware Database 210 and then modified to have the user's current attribute settings. A configuration file stored on disk and the current configuration loaded into memory both have the same organization. This section describes the structure of a configuration and the relationships between Configuration Manager objects. A relationship between two objects is represented by a pair of directed "links" of complementary types and opposite direction. The Find function uses links to traverse the configuration; the user may specify the kinds of links to traverse (see the Configuration Manager Functions section). The different link types are listed below (with corresponding C constants shown in italics, as defined in cfqenum.h) and explained in the following paragraphs.

Child kCfqValChildLink
Parent kCfqValParentLink
ConnectTo kCfqValConnectToLink
ConnectFrom kCfqValConnectFromLink
MeasuredBy kCfqValMeasuredByLink
Measures kCfqValMeasuresLink In addition, there is a BaseClass link type (kCfqValBaseClassLink) that is used internally by the Configuration Manager 202.

Configuration Organization: Parent-Child Links

The basic structure of a configuration is a tree, in which an object at one level has "child" links to objects at a lower level; and the lower-level objects have "parent" links to the higher-level object. A ConfigRootClass object is always at the root of the parent-child tree. Its child objects include all the different product objects representing the hardware. A product object may have child objects for each AI and AO channel. A product only has channel objects as children if it requires channel-dependent attributes, for example, the gain of each AI channel. The channel objects are distinguished by their IDNum attribute, which is the channel number. Currently, digital port attributes are kept by the product object; in the preferred embodiment, separate digital channel objects are maintained.

This parent-child tree structure is shown in Table 3, with each child level indented. This configuration example shows an AT-MIO E-series board with an SCXI chassis with one SCXI-1120 module and one SCXI-1320 terminal block.

TABLE 3

| Parent-Child Links |
| --- |
| ConfigRootClass |
|     SystemClass |
|         DeviceClass |
|             AIChanClass (IDNum = 0) |
|             AIChanClass (IDNum = 1) |
|             . . . |
|             AIChanClass (IDNum = 15) |
|             AOChanClass (IDNum = 0) |
|             AOChanClass (IDNum = 1) |
|             DevISAPnPConnClass |
|         SCXIModClass |
|             AIChanClass (IDNum = 0) |
|             AIChanClass (IDNum = 0) |
|             . . . |
|             AIChanClass (IDNum = 7) |
|     SCXIChassClass |
|     AccessoryClass |

Configuration Organization: ConnectTo-ConnectFrom Links

In addition to the basic tree organization of parent-child links, there are other links between objects that represent physical connections between hardware. These links are made to special connection objects that implement connection, disconnection, and verification. These connection objects are also children of the configuration root. FIG.

19 illustrates a table which shows the basic tree from Table 3 with these objects and links added. Connection objects are shown with bold borders. ConnectTo links are shown as solid lines and ConnectFrom links are shown as dashed lines.

Configuration Organization: MeasuredBy-Measures Links

Figure 20:
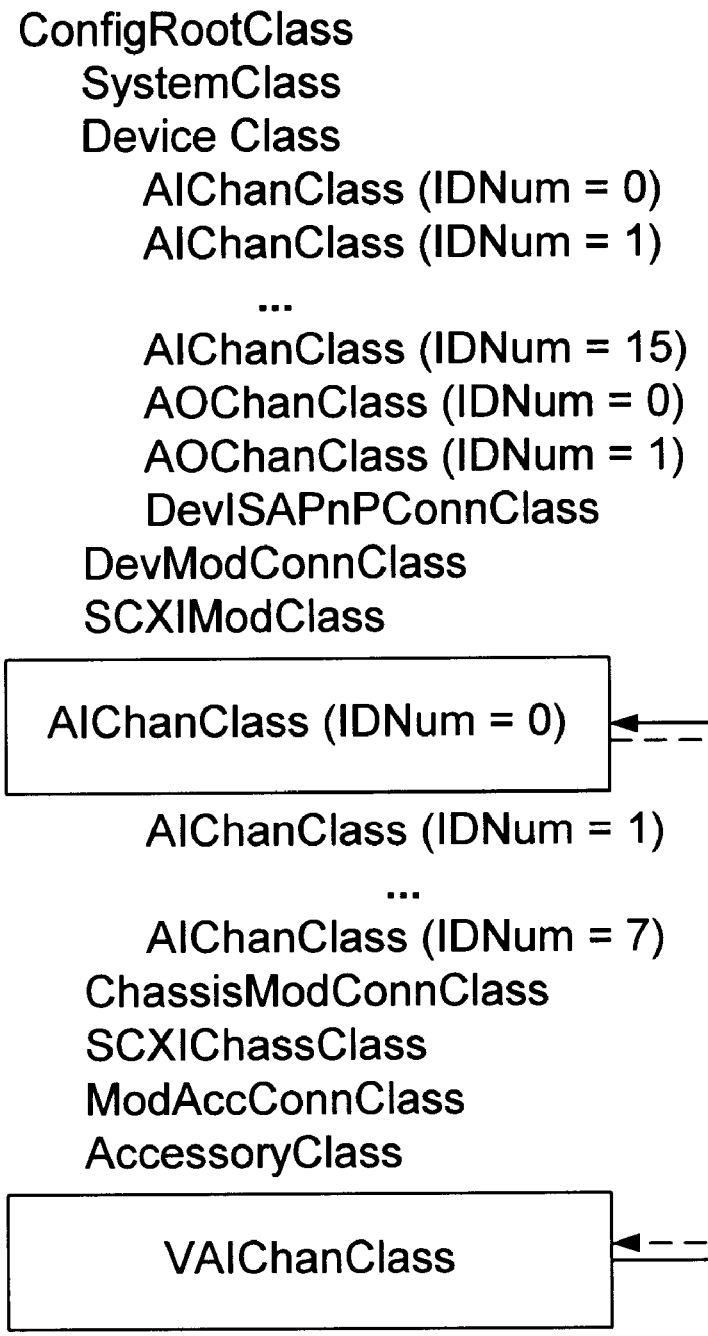
FIG. 20 illustrates "Measured" and "Measured By" links between objects.

If a configuration contains virtual channels that were configured by the Channel Wizard, then it has links between virtual channels and the physical channels that measure them. FIG. 20 is a table which shows one virtual channel configured to use channel 0 of the SCXI module in this example configuration. MeasuredBy links are shown as solid lines and Measures links are shown as dashed lines.

Configuration Organization: BaseClass Links

A client of the Configuration Manager 202 does not use BaseClass links for connecting or finding objects, but it is useful to know what they are. Every object in a configuration has a link to its baseclass object. The Configuration Manager 202 uses these BaseClass links to implement attribute inheritance and to implement the kCfqClassEqual operator of the Find function. The BaseClass links of objects in a configuration actually link to their "default" or "prototype" objects in the Hardware Database hierarchy. When the configuration is saved in a file, the object ID of the baseclass object is stored so that the link can be reestablished when the configuration is loaded (object IDs of Hardware Database objects never change).

Configuration Manager API Introduction

This section describes commonly used functions and introduces some important concepts in the Configuration Manager API.

Common Sequences of Function Calls

The outline below shows how the Configuration Manager API functions are most commonly used. These functions can be used in other ways, and there are more functions than listed here; for more information on additional function, refer to the API Reference sections.
Steps 1–3 access information in the Hardware Database.
1. BuildObjId: Get a handle to a particular product in the Hardware Database. This handle is necessary to reference the object in any other API function, such as getting an attribute value.
2. CfqGet: Get the value of any attribute of the product or its channels.
3. CfqGetPoss: Get the possible values (capabilities) of any attribute of the product or its channels.
Steps 4–9 access an existing configuration.
4. CfqGetCurrentConfiguration: Get a handle to the root object of the current configuration (as specified by the user in the Config Utility).
5. CfqLoadFromFile: Instead of getting the current configuration, you can load another configuration from a file and get a handle to its root object.
6. CfqFind (et al): Search for a particular product in the configuration, beginning at the root.
7. CfqGet: Get the value of some attribute of the product or its channels.
8. CfqSet: Change the value of some attribute of the product or its channels.
9. CfqSaveToFile: Save the configuration.

Steps 10–16 create a brand-new configuration hierarchy.
10. BuildObjId: Get a handle to a default configuration root object in the Hardware Database.
11. CfqCopy: Copy the default configuration root object before adding to it.
12. BuildObjId: Get a handle to a particular product in the Hardware Database.
13. CfqCopy: Copy the product from the Hardware Database before adding it to the current configuration or modifying it.
14. CfqLink: Add the device to the configuration root object.
15. CfqSet: Change the value of some attribute of the device or its channels.
16. CfqSaveToFile: Save the new configuration in a file.

Object IDs

Every object has an ID or "handle" that is needed to refer to that object in the API functions. All the objects in the Hardware Database have persistent IDs; that is, object IDs for Hardware Database objects are known and never change. These persistent object IDs are constructed from the object type and the object IDCode by the BuildObjId function. Therefore, the object ID of any Hardware Database object can be obtained directly.

In contrast, the Configuration Manager 202 assigns a unique but unpredictable ID to an object copied from the Hardware Database. The CfqLoadFromFile or CfqGetCurrentConfiguration functions provide the object ID of the root of a configuration; but the Find functions must be used to get the object ID of any other object in the configuration.

Attribute Data Types

Description of C API data type parameters
string, unsigned 32 bit word (U32), signed 32 bit word (I32), double precision floating point number F64,
pairs, arrays, and arrays of pairs of the above types

Configuration Manager C API Reference

BuildObjId

```
/*
    Object IDs are built up from the object type and a code
    unique to that type in order to uniquely identify an object
    in the hardware database.
*/
typedef u32 tCfqObjId;
/*
    The object type of a CfqObjId is the value of the "kCfqAttrObjClass"
    attribute for that object. The legal values for this attribute are
    defined in "CfqEnum.h"
    In some special cases, a superclass of that class may be
    substituted. E.g., kCfqValDAQProductClass is a sufficiently
    specific type for any product (whether or not it is also a member
    of the more specific classes kCfqValDeviceClass,
    kCfqValAccessoryClass, kCfqValSCXIChassClass, or
    kCfqValSCXIModClass, etc.)
*/
typedef u32 tCfqObjType;
/* TEMPORARY */
typedef tCfqObjId CfqObjId;
/*
```

Domain ID codes are used to differentiate between different members of a single class to ensure the uniqueness of the CfqObjId. They consist of the value of the attribute "IDCode" for an object. For different types of objects, that is defined as:

For CfqProduct, the IDCode is the National Instruments product ID (currently a 12-bit hex value), which uniquely specifies each product. These values may be found in the header file "CfqPrdId.h".

For CfqAttribute, a unique IDCode is given in the "CfqAttId.H" header file. The codes are arbitrary but assigned to a specific value when the attribute is first defined in PSM format, and remain constant thereafter.

```
*/
typedef u32 tCfqDomainId;
/*
    There is one predefined tCfqDomainId which is used for
    classes which have only one member, and thus do not
    need different codes to distinguish between them.
    For instance, an object of type kCfqValConfigRootClass,
    kCfqValVAIChanClass, kCfqValVAOChanClass, or kCfqValVDIOChanClass
    will have an IDCode of kCfqDefaultIdCode.
*/
#define kCfqDefaultIdCode ((tCfqDomainId)0x0)
/*
    There are two predefined CfqObjIds.
    InvalidObjId has:
        a type of      kCfqValInvalidObjClass (= 0),
        and a domainId of kCfqDefaultIdCode (= 0)
    This is guaranteed to differ from any valid
    CfqObjId for an object.
*/
#define kCfqInvalidObjId ((tCfqObjId)0x0)
/*
    HWDBRootId has:
        a type of      kCfqValHWDBRootClass (= 0),
        and a domainId of kCfqDefaultIdCode (= 0)
    This is the value generated using the internal call
    GetProtoObj(kCfqInvalidObjId, kCfqValHWDBRootClass,
            kCfqDefaultIdCode);
    It is used to specify the root of the hardware
    database for calls such as a Find on the entire
    database.
*/
#define kCfqHWDBRootId (1 << 24)
#ifdef __cplusplus
extern "C" {
#endif
/*
    The rest of the CfqObjIds are generated using this function, with
    parameters as defined above.
    Example: To get a handle to an AT-MIO-16F-5:
        mio16f5ObjId = BuildObjId(kCfqValDAQProductClass, kCfqProdATMIO16F5);
*/
CfqObjId CFQEXPORT BuildObjId(tCfqObjType type, tCfqDomainId domainIdCode);
#ifdef __cplusplus
}
#endif
CfqDestroy
/*  CfqDestroy()
    function
        Unlink an object from its hierarchy, if necessary, then destroy it
        and all its owned objects.
    inputs
        cfqObj      Identifies the object to destroy.
    outputs
        noError         No error.
*/
tCfqErr CFQEXPORT CfqDestroy(tCfqObjId cfqObj);
CfqLink
/*  CfqLink()
    function
        Create a link between two CfqObj's.
    inputs
        obj1        Identifies the first object to link.
        obj2        Identifies the second object to link.
        linkType    Indicates the type of link to create (see "cfqlinkt.h").
    outputs
        noError         No error.
*/
tCfqErr CFQEXPORT CfqLink(tCfqObjId obj1, tCfqObjId obj2,
                tCfqLinkType linkType);
CfqUnlink
/*  CfqUnlink()
    function
        Destroy a link between two objects. The object is not destroyed
```

-continued

```
            and is still valid.
    inputs
        obj1        Identifies the first linked object.
        obj2        Identifies the second linked object.
        linkType    Indicates the type of link to destroy (see "cfqlinkt.h").
    outputs
        noError     No error.
*/
tCfqErr CFQEXPORT CfqUnlink(tCfqObjId obj1, tCfqObjId obj2,
                tCfqLinkType linkType);
CfqCopy
/* CfqCopy()
    function
        Copy an object and all its linked objects. Use CfqLink to add
        the copied object to a configuration hierarchy. Use CfqDestroy()
        to destroy the object later.
    inputs
        cfqObj      Identifies the object to copy.
        copyObj     On return, identifies the new copy of the object.
    outputs
        noError     No error.
*/
tCfqErr CFQEXPORT CfqCopy(tCfqObjId cfqObj, tCfqObjId *copyObj);
CfqSaveToFile
/*  CfqSaveToFile()
    function
        Save an object hierarchy to a file.
    inputs
        cfqObj      Identifies the root object to be saved. This is usually
                    a top-level configuration object, but can be any object.
        dest        Points to an ASCII filename.
    outputs
        noError     No error.
*/
tCfqErr CFQEXPORT CfqSaveToFile(tCfqObjId cfqObj, char *dest);
CfqLoadFromFile
/*  CfqLoadFromFile()
    function
        Load the object hierarchy from a file.
    inputs
        source      Points to an ASCII filename.
        cfqObj      On return, identifies the top-level object that was loaded
                    from the file. This is usually a top-level configuration
                    object, but can be any object.
    outputs
        noError     No error.
*/
tCfqErr CFQEXPORT CfqLoadFromFile(tCfqObjId *cfqObj, char *source);
CfqFindInit
/*  CfqFindInit()
    function
        Allocate resources for a new find operation.
    inputs
        startObj    Identifies the object where the search will start. This
                    is usually a top-level configuration object or one of its
                    first-level children (e.g. a product object).
        linkType    Specifies the type(s) of link to follow during the
                    find operation (see cfqtypes.h).
        conjType    Specifies how multiple attribute comparisons, specified
                    by CfqFindSpec(), will be combined for this find
                    operation (see cfqtypes.h).
        handlePtr   On return, contains a handle that identifies the new find
                    operation. Use the same handle for all find calls belonging
                    to the same operation.
    outputs
        noError     No error.
*/
tCfqErr CFQEXPORT CfqFindInit(tCfqObjId startObj, tCfqLinkType linkType,
                tCfqFindConj conjType, tCfqFindId *handlePtr);
CfqFindSpec
/*  CfqFindSpec()
    function
        Specify criteria for a find operation. Call this function repeatedly
        to specify multiple attributes to match. An arbitrary number of
        attributes (subject to memory constraints) may be specified for one
        search.
    inputs
        handle      Identifies the find operation, obtained from CfqFindInit().
        compOp      Specifies how the attribute and value should be compared
```

-continued

```
                (see cfqtypes.h).
        attrId          Identifies the attribute to be matched.
        attrData        Points to the data to match.
        attrType        Indicates the type of data pointed to by attrData.
        numElts         Indicates the size of the data pointed to by attrData:
                        - for scalar types (including strings), 1.
                        - for pair types (including strings), the number of pairs.
                        - for arrays (including strings), the number of array
                          elements.
    outputs
        noError         No error.
*/
tCfqErr CFQEXPORT CfqFindSpec(tCfqFindId handle, tCfqFindOp compOp, u32 attrId,
                    void *attrData, tCfqAttrType attrType, u32 numElts);
CfqFind
/*  CfqFind()
    function
        Find an object matching the criteria specified through CfqFindSpec().
        If no criteria have been specified, every object will match. Call this
        function repeatedly to find multiple objects matching the same
        criteria. The start object (specified by CfqFindInit()) forwards the
        find message to its linked objects connected by the type(s) of link
        specified by CfqFindInit().
    inputs
        handle          Identifies the find operation, returned from CfqFindInit().
        matchObj        Points to the ObjID returned by the Configuration Mgr of the
                        matching object. If no matching object is found,
                        invalidObjId is stored in *matchObj and an error is
                        returned.
    outputs
        noError         No error.
        kNoMatchFound   No matching object was found.
*/
tCfqErr CFQEXPORT CfqFind(tCfqFindId handle, tCfqObjId *matchObj);
/*  CfqFindDone()
    function
        Release the resources allocated for a find operation.
    inputs
        handle          Identifies a find operation, obtained from CfqFindInit().
    outputs
        noError         No error.
*/
CfqFindDone
tCfqErr CFQEXPORT CfqFindDone(tCfqFindId handle);
CfqFindOnce
/*  CfqFindOnce()
    function
        Find an object matching specified criteria. This function is a
        wrapper for the other Find functions for the simple case where:
        - the search critieria consist of a single attribute, and
        - at most one configuration object needs to be found.
    inputs
        startObj        Same as for CfqFindInit().
        linkType        Same as for CfqFindInit().
        compOp          Same as for CfqFindSpec().
        attrId          Same as for CfqFindSpec().
        attrData        Same as for CfqFindSpec().
        attrType        Same as for CfqFindSpec().
        numElts         Same as for CfqFindSpec().
        matchObj        Same as for CfqFind().
    outputs
        noError         No error.
*/
tCfqErr CFQEXPORT CfqFindOnce(tCfqObjId startObj, tCfqLinkType linkType, u32 attrId,
                    void *attrData, tCfqFindOp compOp, tCfqAttrType attrType,
                    u32 numElts, tCfqObjId *matchObj);
CfqGetAttrList
/*  CfqGetAttrList()
    function
        Get a list of attributes supported by an object.
    inputs
        cfqObj          Identifies the object of interest.
        attrIdList      Points to user-allocated space where the attribute list
                        will be stored. If attrIdList is NULL, the number of
                        attributes supported by the object is returned in numElts.
                        The caller can use this information to allocate the right
                        amount of space for the data.
        numElts         The value passed in numElts indicates the number of elements
                        allocated for attrIdList. The Configuration Mgr fills attrIdList
```

```
                    with up to numElts attribute IDs. On return, numElts
                    indicates the number of attribute IDs stored in attrIdList
                    (unless attrIdList is NULL; see above). A warning
                    (-kIncompleteData) is returned if not enough space was
                    allocated for all the attribute IDs.
        outputs
            noError         No error.
            -kIncompleteData    Not enough space was allocated for attrIdList.
*/
tCfqErr CFQEXPORT CfqGetAttrList(tCfqObjId cfqObj, u32 *attrIdList, u32 *numElts);
CfqSet
/*  CfqSet()
    function
        Set the value of an attribute of an object.
    inputs
        cfqObj      Identifies the object of interest.
        attrId      Identifies the attribute of interest.
        attrData    Points to the user-allocated space that contains the
                    attribute data. Strings are stored followed by null
                    terminators; arrays of strings are stored as concatenated,
                    null-terminated strings.
        attrType    Indicates the storage format of the data in attrData. The
                    Configuration Mgr will convert the data to the attribute's
                    inherent data type if necessary (but not in the caller's
                    data buffer).
        numElts     Indicates the size of the data pointed to by attrData:
                    - for scalar types (including strings), 1.
                    - for pair types (including strings), the number of pairs.
                    - for arrays (including strings), the number of array
                      elements.
    outputs
        noError         No error.
        -kInvalidAttrSetting Illegal value for this attribute;
                        or can't be set in this object.
*/
tCfqErr CFQEXPORT CfqSet(tCfqObjId cfqObj, u32 attrId, void *attrData,
                tCfqAttrType attrType, u32 numElts);
CfqGet
/*  CfqGet()
    function
        Get the value of an attribute of an object.
    inputs
        cfqObj      Identifies the object of interest.
        attrId      Identifies the attribute of interest.
        attrData    Points to the user-allocated space that will be filled
                    with attribute data. (Strings are stored followed by null
                    terminators; arrays of strings are stored as concatenated,
                    null-terminated strings.) If attrData is NULL, the Configuration Mgr only returns
the actual array or string length in
                    numElts, and (possibly) the inherent data type of the
                    attribute in attrType. The caller can use this information
                    to allocate the right amount of space for the data.
        attrType    Indicates the desired storage format of the attribute data.
                    If the caller passes kCfqNoType for attrType, then on
                    return attrType indicates the inherent data type of the
                    attribute. Otherwise, the data is converted to the
                    specified type, if possible, before being stored in
                    attrData. An error (kInvalidTypecast) is returned if the
                    requested type conversion cannot be performed.
        numElts     The value passed in numElts indicates the maximum size of
                    the data to store in attrData:
                    - for scalar numeric types, 1.
                    - for numeric arrays, the number of array elements.
                    - for numeric pair arrays, the number of pairs.
                    - for all string types, the number of chars, including a
                      null terminator for each string.
                    - If kCfqNoType is passed for attrType, the caller should
                      pass in the number of bytes allocated for attrData.
                    On return, numElts indicates the size of the data that was
                    stored in attrData:
                    - for scalar types (including strings), 1.
                    - for pair types (including strings), the number of pairs.
                    - for arrays (including strings), the number of array
                      elements.
                    If attrData is NULL, then on return numElts indicates what
                    the size of the data would be after conversion to the
                    type specified by attrType:
                    - If attrType is kCfqCStr then the value returned in
                      numElts is in bytes, not elements.
```

-continued

```
                    - If attrType is kCfqNoType, the attribute's inherent
                      data type is used to determine the size of the data.
        outputs
            noError          No error.
            kInvalidTypecast   The requested typecast cannot be performed.
            -kIncompleteData   Not enough space was allocated for attrData.
*/
tCfqErr CFQEXPORT CfqGet(tCfqObjId cfqObj, u32 attrId, void *attrData,
                 tCfqAttrType *attrType, u32 *numElts);
CfqSetDfltPoss
/*  CfqSetDfltPoss()
    function
        Set the default value and possible values of an attribute of an object.
        If the attribute is not found, add it to the object.
        inputs
            cfqObj       Identifies the object of interest.
            attrId       Identifies the attribute of interest.
            dfltData     Specifies attribute's default value.
                         (see "attrData" in description of Set).
            dfltType     Specifies attribute's inherent data type.
                         (see "attrType" in description of Set).
            dfltNumElts Indicates the size of the data in dfltData.
                         (see "numElts" in description of Set).
            possData     Specifies attribute's list of possible values.
                         (see "attrData" in description of Set).
            possType     Must be array of attribute's inherent data type,
                         unless inherent type is already array.
                         (see "attrType" in description of Set).
            possNumElts Indicates the number of array elements in possData.
                         (see "numElts" in description of Set).
        outputs
            noError          No error;
            -kInvalidAttrSetting Illegal value for this attribute;
                         or can't be set in this object.
*/
tCfqErr CFQEXPORT CfqSetDfltPoss(tCfqObjId cfqObj, u32 attrId,
                 void *dfltData, tCfqAttrType dfltType, u32 dfltNumElts,
                 void *possData, tCfqAttrType possType, u32 possNumElts);
CfqGetDflt
/*  CfqGetDflt()
    function
        Get the default value of an attribute of an object. This function is
        similar to CfqGet above, but returns the factory-default value for
        the specified attribute.
        inputs
            cfqObj       Same as for CfqGet().
            attrId       Same as for CfqGet().
            attrData     Same as for CfqGet().
            attrType     Same as for CfqGet().
            numElts      Same as for CfqGet().
        outputs
            noError          No error.
*/
tCfqErr CFQEXPORT CfqGetDflt(tCfqObjId cfqObj, u32 attrId, void *attrData,
                 tCfqAttrType *attrType, u32 *numElts);
CfqGetPoss
/*  CfqGetPoss()
    function
        Get possible values for an attribute of an object, according to the
        hardware's capabilities. This function is similar to CfqGet(), but
        returns all possible values for the specified attribute.
        inputs
            cfqObj       Identifies the object of interest.
            attrId       Identifies the attribute of interest.
            attrData     Points to the user-allocated memory where the possible
                         values for the attribute will be stored. The possible
                         values are represented as a list of pairs. (String pairs
                         are stored as concatenated, null-terminated strings.) A
                         discrete possible value is represented by the same value
                         in attrData[i] and attrData[i + 1], where i is even. A
                         range of possible values is represented by the lower bound
                         in attrData[i] and the upper bound in attrData[i + 1]
                         (bounds are inclusive). A range for string type is any
                         value falling within the bounds lexically, except that
                         embedded numbers are compared numerically (e.g., CH0 <
                         CH7 < CH10). If attrData is NULL, the Configuration Mgr only
                         returns the actual array or string length in numElts, and
                         (possibly) the inherent data type of the attribute in
                         attrType. The caller can use this information to allocate
```

-continued

```
                    the right amount of space for the data.
            attrType    Same as for CfqGet().
            numElts     Same as for CfqGet().
        outputs
            noError     No error.
*/
tCfqErr CFQEXPORT CfqGetPoss(tCfqObjId cfqObj, u32 attrId, void *attrData,
                tCfqAttrType * attrType, u32 *numElts);
CfqGetCurrPoss
/*  CfqGetCurrPoss()
        function
            Get possible values for specified attribute of specified object,
            limited to valid values for the current configuration. This
            function is similar to CfqGetPoss above, but instead of returning
            all possible values supported for the specified attribute, applies
            configuration rules to determine which of those values are currently
            valid for the specified attribute.
        inputs
            cfqObj      Same as for CfqGetPoss().
            attrId      Same as for CfqGetPoss().
            attrData    Same as for CfqGetPoss().
            attrType    Same as for CfqGetPoss().
            numElts     Same as for CfqGetPoss().
        outputs
            noError     No error.
*/
tCfqErr CFQEXPORT CfqGetCurrPoss(tCfqObjId cfqObj, u32 attrId, void *attrData,
                tCfqAttrType *attrType, u32 *numElts);
CfqVerify
/*  CfqVerify()
        function
            Verify the current configuration. Applies configuration rules to see
            if the current configuration of an object is valid. The specified
            object checks if it is valid, and also forwards the verify message
            to its linked objects, as necessary.
        inputs
            cfqObj      Identifies the object of interest.
            errorList   Points to user-allocated memory where an array (of size numErrs)
                        of tCfqErr's will be stored.
            errObjIdList Points to user-allocated memory where an array (of size numErrs)
                        of tCfqObjId's associated with the errors will be stored.
            attrIdList  Points to user-allocated memory where an array (of size numErrs)
                        of attribute id's associated with the errors will be stored.
            numErrs     The value passed in numErrs is the maximum number of
                        errors to store in the various error lists.
                        On return, numErrs indicates the number of errors that were
                        stored in the various error lists.
        outputs
            noError     No error.
*/
tCfqErr CFQEXPORT CfqVerify(tCfqObjId cfqObj, tCfqErr *errorList,
    tCfqObjId *errObjIdList, u32 *attrIdList, u32 *numErrs);
CfqReplace
/*  CfqReplace()
        function
            Replace an object in the configuration with a different object.
            This function transfers parent, connect, and measure links
            from the replaced object to the replacing object. Children
            of the replaced object are recursively replaced with appropriate
            matching children from the replacing object, transferring
            connect and measure links. (Parent links are not recursively
            transferred.) The Replace function does not destroy the
            replaced product.
        inputs
            replacedObj     identifies the object the be replaced
            replacingObj    identifies the object to replace the replacedObj
*/
tCfqErr CFQEXPORT CfqReplace(tCfqObjId replacedObj, tCfqObjId replacingObj);
CfqResolve
/*  CfqResolve()
        function
            Resolve current configuration. This function is not supported.
        inputs
            cfqObj
        outputs
*/
tCfqErr CFQEXPORT CfqResolve(tCfqObjId cfqObj);
/*  CfqConnect()
        function
```

-continued

```
            Connect the first object in objList to all other objects in objList
            with a connection of connType. Returns the connection object id in
            connObj.
        inputs
            connType      The type of connection to create.
            objList       A list of the objects to connect. The first object in the
                          list is the object that is connected to all the other objects
                          in the list.
            numObj        The number of objects in objList.
            connObj       On return the id of the connection object.
        outputs
            noError       No error.
*/
CfqConnect
tCfqErr CFQEXPORT CfqConnect(u32 connType, tCfqObjId *objList, u32 numObj,
                tCfqObjId *connObj);
/*    CfqDisconnect()
        function
            Disconnect the objects in objList from connObj. If all objects connected
            by connObj are disconnected, connObj is deleted. If objList is NULL or
            numObj is zero, all objects are disconnected and connObj is deleted.
        inputs
            connType      The type of connection to disconnect.
            objList       A list of the objects to disconnect.
            numObj        The number of objects in objList.
            connObj       The id of the connection object returned from a previous
                          call to CfqConnect().
        outputs
            noError       No error.
*/
CfqDisconnect
tCfqErr CFQEXPORT CfqDisconnect(u32 connType, tCfqObjId *objList, u32 numObj,
                tCfqObjId *connObj);
CfqConnectedTo
/*    CfqConnectedTo()
        function
        inputs
            connType
            objList
            numObj
            connObj
        outputs
*/
tCfqErr CFQEXPORT CfqConnectedTo(u32 connType, tCfqObjId *objList, u32 *numObj,
                tCfqObjId *connObj);
CfqGetCurrentConfiguration
/*    CfqGetCurrentConfiguration()
        function
            Get the handle to the current configuration.
        inputs
            cfqObj
        outputs
            noError       No error.
*/
tCfqErr CFQEXPORT CfqGetCurrentConfiguration(tCfqObjId *cfqObj);
CfqRemoveCurrentConfiguration
/*    CfqRemoveCurrentConfiguration()
        function
            removes the object pointed to by the current configuration root,
            returning that object to the caller. The next call to
            GetCurrentConfiguration will reload from file specificed by
            GetCurrentConfigFileName. This call does not delete the previous
            current configuration root object.
        inputs
            none
        outputs
            error code and returned previous configuration root.
*/
tCfqErr CFQEXPORT CfqRemoveCurrentConfiguration(tCfqObjId *oldRoot);
CfqGetCurrentConfigFileName
/*    CfqGetCurrentConfigFileName()
        function
            Get the full path to the current configuration file.
        inputs
            fileName
            length
        outputs
            error code
*/
```

-continued

```
tCfqErr CFQEXPORT CfqGetCurrentConfigFileName(char *fileName,u32 *length);
CfqSetCurrentConfigFileName
/*    CfqSetCurrentConfigFileName()
      function
          Get the full path to the current configuration file.
      inputs
          fileName
      outputs
          error code
*/
tCfqErr CFQEXPORT CfqSetCurrentConfigFileName(char *fileName);
CfqIsCurrentConfigCurrent
/*    CfqIsCurrentConfigCurrent()
      function
          Determines whether the open current configuration for this process
          is current for all processes (has any process saved to the current
          config file name since the last GetCurrentConfiguration call was
          made by this process?)
      inputs
          none
      outputs
          an i32 boolean indicating whether the current config is current
*/
i32 CFQEXPORT CfqIsCurrentConfigCurrent();
CfqMatchClass
/*    CfqMatchClass()
      function
          Indicates whether the specified object is of a specified class.
      inputs
          object to check, class to match.
      outputs
          error code: noError on a match, noMatchFound on no match
*/
tCfqErr CFQEXPORT CfqMatchClass(tCfqObjId id, u32 cls);
CfqDebugPrint
/*    CfqDebugPrint()
      function
      inputs
          id
          file
          verboseLevel
      outputs
*/
tCfqErr CFQEXPORT CfqDebugPrint(tCfqObjId id, char * file, u32 verboseLevel);
Configuration Manager LabVIEW API Reference
Configuration Manager Error Codes
/* ERROR INFORMATION */
typedef i32 CfqErr;
typedef CfqErr     tCfqErr;
#define kCfqErrorBase -28000
#ifndef noErr
#define noErr 0
#endif
#define kInvalidAttrSetting         (kCfqErrorBase - 1)
#define kUnidentifiedConfigImage    (kCfqErrorBase - 2)
#define kInvalidObjId               (kCfqErrorBase - 3)
#define kInvalidAttrCode            (kCfqErrorBase - 4)
#define kDuplicateAttrCode          (kCfqErrorBase - 5)
#define kInvalidAttrType            (kCfqErrorBase - 6)
#define kInvalidFindId              (kCfqErrorBase - 7)
#define kInvalidTypecast            (kCfqErrorBase - 8)
#define kIncompleteData             (kCfqErrorBase - 9)
#define kFindInProgress             (kCfqErrorBase - 10)
#define kNoMatchFound               (kCfqErrorBase - 11)
#define kInvalidValue               (kCfqErrorBase - 12)
#define kUndefinedValue             (kCfqErrorBase - 13)
#define kAlreadyLinked              (kCfqErrorBase - 14)
#define kLinkNotFound               (kCfqErrorBase - 15)
#define kInvalidConfiguration       (kCfqErrorBase - 16)
#define kInvalidOperationOnPrototype (kCfqErrorBase - 17)
#define kConfigFileError            (kCfqErrorBase - 18)
#define kInvalidConn                (kCfqErrorBase - 19)
#define kInvalidConnList            (kCfqErrorBase - 20)
#define kInvalidConnType            (kCfqErrorBase - 21)
#define kAttrIsNotEnum              (kCfqErrorBase - 22)
#define kNoVXIPresent               (kCfqErrorBase - 23)
#define kVXIInitNotRun              (kCfqErrorBase - 24)
#define kVXIResManNotRun            (kCfqErrorBase - 25)
#define kVXIResManNotInSync         (kCfqErrorBase - 26)
```

```
-continued define kVXINoDynamicInfoAvail      (kCfqErrorBase - 27)
define kReplaceNotOKError          (kCfqErrorBase - 28)
```

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A data acquisition (DAQ) system, comprising:
a computer system including a CPU, a system memory, and a nonvolatile memory;
at least one data acquisition device coupled to the computer system, wherein the data acquisition device is operable to generate/receive data;
a separate hardware database stored in the nonvolatile memory of the computer system which stores information regarding a plurality of DAQ objects of which only a subset are installed in the DAQ system;
one or more configuration files stored in the nonvolatile memory of the computer system which each store a configuration of the DAQ system;
a configuration manager stored in the system memory of the computer system which controls access to the hardware database and which controls access to the configuration files;
at least one user application stored in the system memory of the computer system which is executable by the CPU to perform a data acquisition function in the DAQ system, wherein the user application calls the configuration manager to access information in the hardware database, wherein the user application calls the configuration manager to access information in the configuration file;
wherein the hardware database is operable to be updated with new information regarding additional capabilities of a DAQ object, thereby producing an updated hardware database;
wherein an existing configuration file created before the hardware database is updated with said new information is operable to access the new capabilities of the DAQ object from the updated hardware database.

2. The DAQ system of claim 1, wherein the hardware database stores default settings of DAQ objects;
wherein the user application is executable to request a default setting of a DAQ object;
wherein the configuration manager is executable to access the hardware database to obtain the default setting of the DAQ object in response to the user application request.

3. The DAQ system of claim 1 wherein the hardware database stores capabilities for one or more DAQ objects;
wherein the user application is executable to request capabilities for a DAQ object;
wherein the configuration manager is executable to access the hardware database to obtain the capabilities for the DAQ object in response to the user application request.

4. The DAQ system of claim 1, wherein the user application is executable to request a current parameter value for a DAQ object;
wherein, in response to the request for the current parameter value of the DAQ object, the configuration manager is executable to locate the DAQ object, wherein the configuration manager accesses the current parameter value from the system memory if the current parameter value is stored in the system memory, wherein the configuration manager retrieves the current parameter value from the hardware database in the nonvolatile memory if the current parameter value is not stored in the system memory.

5. The DAQ system of claim 4, wherein the user application is executable to request to set a parameter value for a DAQ object;
wherein, in response to the request to set the parameter value of the DAQ object, the configuration manager is executable to set the parameter value in the system memory;
wherein the configuration manager sets the parameter to a value different than its default value.

6. The DAQ system of claim 5, wherein the configuration manager accesses the current parameter value from the system memory if the current parameter value has been set to a value different than its default value, wherein the configuration manager retrieves the current parameter value from the hardware database in the nonvolatile memory if the current parameter value has not been changed from its default value.

7. The DAQ system of claim 1, further comprising:
a system settings manager stored in the memory of the computer system which stores information regarding detected devices in the DAQ system, wherein the system settings manager further stores system settings for DAQ devices in the computer system;
wherein the configuration manager communicates with the system settings manager to access system settings for DAQ devices in the computer system.

8. The DAQ system of claim 1, wherein each of said one or more configuration files stores modified parameter values of DAQ objects;
wherein the configuration manager is executable to access modified parameter values of DAQ objects from the one or more configuration files.

9. The DAQ system of claim 8, wherein the configuration manager is executable to load a first configuration file from the nonvolatile memory into the system memory to apply a first configuration to the DAQ system, wherein the first configuration is specified by the first configuration file;
wherein, when the configuration manager loads the first configuration file, the configuration manager is executable to match up DAQ objects in the configuration file with DAQ objects detected in the DAQ system to ensure that the first configuration file is applicable to the DAQ system.

10. The DAQ system of claim 1, wherein DAQ objects include DAQ devices and virtual channels, wherein virtual channels identify a configuration of a physical DAQ channel.

11. The DAQ system of claim 1, further comprising:
a configuration utility stored in the system memory of the computer system which is executable to create a configuration file.

12. A method for providing access to information on data acquisition (DAQ) objects in a DAQ system, wherein the DAQ system comprises a computer system including a CPU, a system memory, and a nonvolatile memory, and at least one data acquisition (DAQ) device coupled to the computer system, wherein the DAQ device is operable to generate/receive data, the method comprising:

a user application executing in the DAQ system;

the user application requesting configuration information on one or more DAQ objects;

a configuration manager executing in the computer system receiving the request for configuration information from the user application;

the configuration manager accessing the configuration information from the system memory if the configuration information comprises modified parameter values;

the configuration manager accessing the configuration information from a hardware database in the nonvolatile memory if the configuration information does not comprise modified parameter values, wherein the hardware database stores default parameter values for DAQ objects;

installing a DAQ object in the computer system;

installing a first hardware database in the computer system;

creating a configuration file which specifies a configuration of the DAQ system, wherein the configuration file is created using the first hardware database, wherein the configuration file includes settings for the DAQ object;

installing an updated hardware database in the computer system after creating the configuration file, wherein the updated hardware database includes information regarding additional capabilities of the DAQ object;

the configuration file automatically accessing the additional capabilities of the DAQ object after installing the updated hardware database, wherein the configuration file obtains information on the additional capabilities of the DAQ object from the updated hardware database.

13. The method of claim 12, wherein the hardware database stores default settings of DAQ objects;

wherein the user application requesting configuration information comprises the user application requesting a default setting of a DAQ object;

wherein the configuration manager accesses the hardware database to obtain the default setting of the DAQ object in response to the user application request.

14. The method of claim 12, wherein the hardware database stores capabilities for one or more DAQ objects;

wherein the user application requesting configuration information comprises the user application requesting capabilities for a DAQ object;

wherein the configuration manager accesses the hardware database to obtain the capabilities for the DAQ object in response to the user application request.

15. The method of claim 12, wherein the DAQ system includes one or more configuration files which each store modified parameter values of DAQ objects;

wherein the configuration manager accessing the configuration information from the system memory comprises the configuration manager accessing the modified parameter values of DAQ objects from the one or more configuration files.

16. The method of claim 12, further comprising:

the configuration manager determining if the configuration information includes system-specific parameters after receiving the request for parameter information;

the configuration manager obtaining the configuration information from a system settings manager if the configuration information includes system-specific parameters.

17. The method of claim 12, further comprising:

the user application requesting to set a parameter value for a DAQ object;

the configuration manager setting the parameter value in the system memory in response to the request to set the parameter value of the DAQ object;

wherein the configuration manager sets the parameter to a value different than its default value.

18. The method of claim 17, wherein the configuration manager accesses the configuration information from the system memory if the configuration information has been set to a value different than its default value, wherein the configuration manager retrieves the configuration information from the hardware database in the nonvolatile memory if the configuration information has not been changed from its default value.

19. The method of claim 12, wherein the DAQ system includes one or more configuration files which each store modified parameter values of DAQ objects; the method further comprising:

the configuration manager loading a first configuration file from the nonvolatile memory into the system memory to apply a first configuration to the DAQ system, wherein the first configuration is specified by the first configuration file;

wherein the configuration manager loading the first configuration file includes the configuration manager matching up DAQ objects in the configuration file with DAQ objects detected in the DAQ system to ensure that the first configuration file is applicable to the DAQ system.

20. The method of claim 12, further comprising:

the user application requesting to set a parameter value for a DAQ object;

the configuration manager receiving the request to set the parameter value;

the configuration manager setting the parameter value in the system memory.

21. The method of claim 12, wherein DAQ objects include DAQ devices and virtual channels, wherein virtual channels identify a configuration of a physical DAQ channel.

22. A method for providing access to new information on data acquisition (DAQ) objects in a DAQ system, wherein the DAQ system comprises a computer system including a CPU, a system memory, and a nonvolatile memory, and at least one data acquisition (DAQ) object comprised in the computer system, the method comprising:

installing a DAQ object in the computer system;

installing a first hardware database in the computer system;

creating a configuration file which specifies a configuration of the DAQ system, wherein the configuration file is created using the first hardware database;

installing an updated hardware database in the computer system after creating the configuration file, wherein the updated hardware database includes information regarding additional capabilities of the DAQ object;

the configuration file automatically accessing the additional capabilities of the DAQ object after installing the updated hardware database, wherein the configuration file obtains information on the additional capabilities of the DAQ object from the updated hardware database.

23. The method of claim 22, wherein the DAQ object is a DAQ interface card.

24. The method of claim 22, wherein the configuration file automatically accessing the additional capabilities of the DAQ object comprises a configuration manager accessing the additional capabilities of the DAQ object from the updated hardware database.

25. The method of claim 22, wherein the updated hardware database includes one or more additional parameters for the DAQ object.

26. The method of claim 22, wherein the configuration file is not required to be modified in order to automatically access the additional capabilities of the DAQ object.

27. The method of claim 22, further comprising:
  installing an updated DAQ object in the computer system after creating the configuration file, wherein the updated DAQ object comprises new capabilities not included in the first hardware database;
  wherein the updated hardware database includes information regarding the new capabilities of the updated DAQ object;
  wherein the configuration file automatically accesses the new capabilities of the updated DAQ object after installing the updated hardware database and after installing the updated DAQ object.

28. The method of claim 22, wherein said creating the configuration file includes setting one or more parameters for the DAQ object.

29. A method for providing access to new information on data acquisition (DAQ) objects in a DAQ system, wherein the DAQ system comprises a computer system including a CPU, a system memory, and a nonvolatile memory, and at least one data acquisition (DAQ) object comprised in the computer system, the method comprising:
  installing a first hardware database in the computer system;
  creating a configuration file which specifies a configuration of the DAQ system, wherein the configuration file is created using the first hardware database;
  installing an updated DAQ object in the computer system after creating the configuration file, wherein the updated DAQ object comprises new capabilities not included in the first hardware database;
  installing an updated hardware database in the computer system after creating the configuration file, wherein the updated hardware database includes information regarding the new capabilities of the updated DAQ object;
  the configuration file automatically accessing the new capabilities of the updated DAQ object after installing the updated DAQ object and after installing the updated hardware database, wherein the configuration file obtains information on the new capabilities of the DAQ object from the updated hardware database.

30. The method of claim 29, wherein the DAQ object comprises a DAQ interface card;
  wherein said installing an updated DAQ object in the computer system comprises installing an updated DAQ interface card in an expansion slot of the computer system.

31. A method for providing access to new information on data acquisition (DAQ) objects in a DAQ system, wherein the DAQ system comprises a computer system including a CPU, a system memory, and a nonvolatile memory, and at least one data acquisition (DAQ) object comprised in the computer system, the method comprising:
  installing a DAQ device in the computer system;
  installing a first hardware database in the computer system;
  creating a configuration file which specifies a configuration of the DAQ system, wherein the configuration file is created using the first hardware database, wherein the configuration file includes settings for the DAQ device;
  installing an updated hardware database in the computer system after creating the configuration file, wherein the updated hardware database includes information regarding additional capabilities of the DAQ device;
  the configuration file automatically accessing the additional capabilities of the DAQ device after installing the updated hardware database, wherein the configuration file obtains information on the additional capabilities of the DAQ device from the updated hardware database.

32. A method for configuring a data acquisition (DAQ) system, wherein the DAQ system comprises a computer system including a CPU, a system memory, and a nonvolatile memory, and at least one data acquisition device coupled to the computer system, wherein the data acquisition device is operable to generate/receive data, the method comprising:
  powering up the computer system;
  loading a configuration file in the computer system to apply a configuration specified by the configuration file to the DAQ system, wherein said loading comprises:
    loading the configuration file into the memory of the computer system;
    matching up DAQ objects in the configuration file with DAQ objects detected in the DAQ system to ensure that the configuration file is applicable to the DAQ system;
    determining if a new DAQ object is present in the system in response to said matching;
    creating a transient object in the system memory for the new DAQ object if a new DAQ object is determined to be present in the system, wherein the transient object is operable to store modified parameter values for the new DAQ object;
    linking the transient object to a reference to an entry in a hardware database which corresponds to the new DAQ object;
    saving the transient object in the configuration file.

33. A memory media which stores a program module for providing access to information on data acquisition (DAQ) objects in a DAQ system, wherein the DAQ system comprises a computer system including a CPU, a system memory, and a nonvolatile memory, and at least one data acquisition (DAQ) device coupled to the computer system, wherein the program module includes program instructions which are executable to implement:
  a configuration manager executing in a computer system and receiving a request for configuration information from a user application;
  the configuration manager accessing the configuration information from the system memory if the configuration information comprises modified parameter values;
  the configuration manager accessing the configuration information from a hardware database in the nonvolatile memory if the configuration information does not comprise modified parameter values, wherein the hardware database stores default parameter values for DAQ objects;

wherein a DAQ object is installed in the computer system; wherein a first hardware database is installed in the computer system; wherein the DAQ system includes a configuration file which specifies a configuration of the DAQ system, wherein the configuration file is created using the first hardware database, wherein the configuration file includes settings for the DAQ object; wherein an updated hardware database is installed in the computer system after creating the configuration file, wherein the updated hardware database includes information regarding additional capabilities of the DAQ object; wherein the program module further comprises program instructions which are executable to implement;

the configuration file automatically accessing the additional capabilities of the DAQ object after installing the updated hardware database, wherein the configuration file obtains information on the additional capabilities of the DAQ object from the updated hardware database.

34. The memory media of claim 33, wherein the hardware database stores capabilities for one or more DAQ objects;

wherein the user application requesting configuration information comprises the user application requesting capabilities for a DAQ object;

wherein the configuration manager accesses the hardware database to obtain the capabilities for the DAQ object in response to the user application request.

35. The memory media of claim 33, wherein the DAQ system includes one or more configuration files which each store modified parameter values of DAQ objects;

wherein the configuration manager accessing the configuration information from the system memory comprises the configuration manager accessing the modified parameter values of DAQ objects from the one or more configuration files.

36. The memory media of claim 33, wherein the user application requests to set a parameter value for a DAQ object; the program module further comprising program instructions which are executable to implement:

the configuration manager setting the parameter value in the system memory in response to the request to set the parameter value of the DAQ object;

wherein the configuration manager sets the parameter to a value different than its default value.

37. The memory media of claim 33, wherein the DAQ system includes one or more configuration files which each store modified parameter values of DAQ objects; the program module further comprising program instructions which are executable to implement:

the configuration manager loading a first configuration file from the nonvolatile memory into the system memory to apply a first configuration to the DAQ system, wherein the first configuration is specified by the first configuration file;

wherein the configuration manager loading the first configuration file includes the configuration manager matching up DAQ objects in the configuration file with DAQ objects detected in the DAQ system to ensure that the first configuration file is applicable to the DAQ system.

38. A data acquisition (DAQ) system, comprising:

a computer system including a CPU, a system memory, and a nonvolatile memory;

at least one data acquisition device coupled to the computer system, wherein the data acquisition device is operable to generate/receive data;

a separate hardware database stored in the nonvolatile memory of the computer system which stores information regarding a plurality of DAQ objects of which only a subset are installed in the DAQ system;

one or more configuration files stored in the nonvolatile memory of the computer system which each store a configuration of the DAQ system;

a configuration manager stored in the system memory of the computer system which controls access to the hardware database and which controls access to the configuration files;

at least one user application stored in the system memory of the computer system which is executable by the CPU to perform a data acquisition function in the DAQ system, wherein the user application calls the configuration manager to access information in the hardware database, wherein the user application calls the configuration manager to access information in the configuration file;

wherein the DAQ device is operable to be updated with new capabilities;

wherein the hardware database is operable to be updated with new information regarding the DAQ device in response to the DAQ device being updated with new capabilities, thereby producing an updated hardware database;

wherein an existing configuration file created before the DAQ device is updated with new capabilities is operable to access the new capabilities of the DAQ device from the updated hardware database.

39. A data acquisition (DAQ) system, comprising:

a computer system including a CPU, a system memory, and a nonvolatile memory;

at least one data acquisition device coupled to the computer system, wherein the data acquisition device is operable to generate/receive data;

a separate hardware database stored in the nonvolatile memory of the computer system which stores information regarding a plurality of DAQ objects of which only a subset are installed in the DAQ system;

one or more configuration files stored in the nonvolatile memory of the computer system which each store a configuration of the DAQ system;

a configuration manager stored in the system memory of the computer system which controls access to the hardware database and which controls access to the configuration files;

at least one user application stored in the system memory of the computer system which is executable by the CPU to perform a data acquisition function in the DAQ system, wherein the user application calls the configuration manager to access information in the hardware database, wherein the user application calls the configuration manager to access information in the configuration file;

wherein each of said one or more configuration files stores modified parameter values of DAQ objects;

wherein the configuration manager is executable to access modified parameter values of DAQ objects from the one or more configuration files;

wherein the configuration manager is executable to load a first configuration file from the nonvolatile memory into the system memory to apply a first configuration to the DAQ system, wherein the first configuration is specified by the first configuration file;

wherein, when the configuration manager loads the first configuration file, the configuration manager is executable to match up DAQ objects in the configuration file with DAQ objects detected in the DAQ system to ensure that the first configuration file is applicable to the DAQ system;

wherein the configuration manager is operable to receive information on a new DAQ object added to the DAQ system;

wherein, in response to the new DAQ object, the configuration manager creates a transient object in system memory, wherein the transient object is operable to store modified parameter values for the new DAQ object, wherein the configuration manager links the transient object to a prototype reference, wherein the prototype reference references an entry for the new DAQ object in the hardware database.

40. A method for providing access to information on data acquisition (DAQ) objects in a DAQ system, wherein the DAQ system comprises a computer system including a CPU, a system memory, and a nonvolatile memory, and at least one data acquisition (DAQ) device coupled to the computer system, wherein the DAQ device is operable to generate/receive data, the method comprising:

a user application executing in the DAQ system;

the user application requesting configuration information on one or more DAQ objects;

a configuration manager executing in the computer system receiving the request for configuration information from the user application;

the configuration manager accessing the configuration information from the system memory if the configuration information comprises modified parameter values;

the configuration manager accessing the configuration information from a hardware database in the nonvolatile memory if the configuration information does not comprise modified parameter values, wherein the hardware database stores default parameter values for DAQ objects;

installing a first hardware database in the computer system;

creating a configuration file which specifies a configuration of the DAQ system, wherein the configuration file is created using the first hardware database;

installing an updated DAQ object in the computer system after creating the configuration file, wherein the updated DAQ object comprises new capabilities not included in the first hardware database;

installing an updated hardware database in the computer system after creating the configuration file, wherein the updated hardware database includes information regarding the new capabilities of the updated DAQ object;

the configuration file automatically accessing the new capabilities of the updated DAQ object after installing the updated DAQ object and after installing the updated hardware database, wherein the configuration file obtains information on the new capabilities of the DAQ object from the updated hardware database.

41. A method for providing access to information on data acquisition (DAQ) objects in a DAQ system, wherein the DAQ system comprises a computer system including a CPU, a system memory, and a nonvolatile memory, and at least one data acquisition (DAQ) device coupled to the computer system, wherein the DAQ device is operable to generate/receive data, the method comprising:

a user application executing in the DAQ system;

the user application requesting configuration information on one or more DAQ objects;

a configuration manager executing in the computer system receiving the request for configuration information from the user application;

the configuration manager accessing the configuration information from the system memory if the configuration information comprises modified parameter values;

the configuration manager accessing the configuration information from a hardware database in the nonvolatile memory if the configuration information does not comprise modified parameter values, wherein the hardware database stores default parameter values for DAQ objects;

the configuration manager receiving information on a new DAQ object added to the DAQ system;

the configuration manager creating a transient object in system memory in response to the new DAQ object, wherein the transient object is operable to store modified parameter values for the new DAQ object;

the configuration manager linking the transient object to a prototype reference, wherein the prototype reference references an entry for the new DAQ object in the hardware database.

42. A memory media which stores a program module for providing access to information on data acquisition (DAQ) objects in a DAQ system, wherein the DAQ system comprises a computer system including a CPU, a system memory, and a nonvolatile memory, and at least one data acquisition (DAQ) device coupled to the computer system, wherein the program module includes program instructions which are executable to implement:

a configuration manager executing in a computer system and receiving a request for configuration information from a user application;

the configuration manager accessing the configuration information from the system memory if the configuration information comprises modified parameter values;

the configuration manager accessing the configuration information from a hardware database in the nonvolatile memory if the configuration information does not comprise modified parameter values, wherein the hardware database stores default parameter values for DAQ objects;

wherein a first hardware database is installed in the computer system; wherein the DAQ system includes a configuration file which specifies a configuration of the DAQ system, wherein the configuration file is created using the first hardware database; wherein an updated DAQ object is installed in the computer system after creating the configuration file, wherein the updated DAQ object comprises new capabilities not included in the first hardware database; wherein an updated hardware database is installed in the computer system after creating the configuration file, wherein the updated hardware database includes information regarding the new capabilities of the updated DAQ object; wherein the program module further comprises program instructions which are executable to implement:

the configuration file automatically accessing the new capabilities of the updated DAQ object after installing the updated DAQ object and after installing the updated hardware database, wherein the configuration file obtains information on the new capabilities of the DAQ object from the updated hardware database.

43. A memory media which stores a program module for providing access to information on data acquisition (DAQ) objects in a DAQ system, wherein the DAQ system comprises a computer system including a CPU, a system memory, and a nonvolatile memory, and at least one data acquisition (DAQ) device coupled to the computer system, wherein the program module includes program instructions which are executable to implement:

a configuration manager executing in a computer system and receiving a request for configuration information from a user application;

the configuration manager accessing the configuration information from the system memory if the configuration information comprises modified parameter values;

the configuration manager accessing the configuration information from a hardware database in the nonvolatile memory if the configuration information does not comprise modified parameter values, wherein the hardware database stores default parameter values for DAQ objects;

the configuration manager receiving information on a new DAQ object added to the DAQ system;

the configuration manager creating a transient object in system memory in response to the new DAQ object, wherein the transient object is operable to store modified parameter values for the new DAQ object; and the configuration manager linking the transient object to a prototype reference, wherein the prototype reference references an entry for the new DAQ object in the hardware database.

* * * * *